US012620327B2

(12) United States Patent
Clemens et al.

(10) Patent No.: US 12,620,327 B2

(45) Date of Patent: May 5, 2026

(54) METHOD FOR PRODUCING A COMPONENT PART, DEVICE FOR PRODUCING A COMPONENT PART, AND COMPONENT PART

(71) Applicants: PolyIC GmbH & Co. KG, Fürth (DE); LEONHARD KURZ Stiftung & Co. KG, Fürth (DE)

(72) Inventors: Wolfgang Clemens, Fürth (DE); Christoph Süss, Fürth (DE); Matthias Popp, Fürth (DE); Martin Hahn, Fürth (DE)

(73) Assignees: PolyIC GmbH & Co. KG, Fürth (DE); LEONHARD KURZ Stiftung & Co. KG, Fürth (DE)

( * ) Notice: Subject to any disclaimer, the term of this patent is extended or adjusted under 35 U.S.C. 154(b) by 144 days.

(21) Appl. No.: 18/621,299

(22) Filed: Mar. 29, 2024

(65) Prior Publication Data

US 2024/0339051 A1 Oct. 10, 2024

(30) Foreign Application Priority Data

Apr. 6, 2023 (DE) ......................... 102023108832.7

(51) Int. Cl.
*G09F 3/02* (2006.01)
*G09F 3/10* (2006.01)

(52) U.S. Cl.
CPC .................. *G09F 3/02* (2013.01); *G09F 3/10* (2013.01); *G09F 2003/0225* (2013.01); *G09F 2003/023* (2013.01); *G09F 2003/0264* (2013.01)

(58) Field of Classification Search
CPC ...... G09F 3/02; G09F 3/10; G09F 2003/0225; G09F 2003/023; G09F 2003/0264
(Continued)

(56) References Cited

U.S. PATENT DOCUMENTS

2003/0017340 A1 1/2003 Jiang et al.
2009/0092751 A1 4/2009 Jiang et al.
(Continued)

FOREIGN PATENT DOCUMENTS

DE 696 30 526 T2 8/2004
DE 602 15 946 9/2007
(Continued)

OTHER PUBLICATIONS

ISO 527-1:2019-12 (Kunststoffe—Bestimmung der Zugeigenschaften—Teil 1: Allgemeine Grundsatze, Ausgabedatum Dec. 2019).
(Continued)

*Primary Examiner* — Justin V Lewis
(74) *Attorney, Agent, or Firm* — Hoffmann & Baron, LLP

(57) ABSTRACT

A method as well as a device for producing a component part (1), wherein a label (2) with a flexible layer structure comprising a carrier layer (23) and a further layer (22) and/or one or more electrical and/or electronic and/or optical and/or optoelectronic components (261) is received by a label receiver (20), wherein a carrier (3) is received by a carrier receiver (30), wherein a flowable adhesive (4) is applied to the label (2) and/or the carrier (3) in one or more defined first shapes and a defined relative movement (45) of the label receiver (20) and the carrier receiver (30) is carried out, wherein the adhesive (4) is arranged between the label (2) and the carrier (3), with the result that one or more adhesive layers (41) are obtained, and wherein an at least partial curing and/or crosslinking of the one or more adhesive layers is then carried out.

33 Claims, 11 Drawing Sheets

(58) Field of Classification Search
USPC .... 40/630, 638, 661.09; 283/67, 70, 72, 101
See application file for complete search history.

(56) References Cited

U.S. PATENT DOCUMENTS

| | | | | |
|---|---|---|---|---|
| 2012/0325402 | A1 | 12/2012 | Suwa et al. | |
| 2013/0064967 | A1 | 3/2013 | Feinstein et al. | |
| 2021/0084771 | A1* | 3/2021 | Volkerink | H05K 3/281 |

FOREIGN PATENT DOCUMENTS

| | | | |
|---|---|---|---|
| DE | 602 15 946 | T2 | 9/2007 |
| EP | 2 487 670 | | 8/2012 |
| EP | 2 487 670 | A1 | 8/2012 |

OTHER PUBLICATIONS

ISO 3219.
DIN EN ISO 3219-1:2021-08 (Rheologie—Teil 1: Begriffe und Formelzeichen für die Rotations—und Oszillationsrheometrie, Ausgabedatum Aug. 2021).
DIN EN ISO 3219-2:2021-08 (Rheologie—Teil 2: Allgemeine Grundlagen der Rotations—und Oszillationsrheometrie, Ausgabedatum Aug. 2021).
German Examination Report.
German Office Action dated Feb. 17, 2025.
European Search Report dated Jun. 6, 2024.

* cited by examiner

METHOD FOR PRODUCING A COMPONENT PART, DEVICE FOR PRODUCING A COMPONENT PART, AND COMPONENT PART

BACKGROUND OF THE INVENTION

The invention relates to a method for producing a component part, a device for producing a component part, and a component part.

To integrate functional labels, such as touch sensors, in component parts, it is known to fasten labels with functional layers which provide such functions to or in a component part carrier by means of mechanical integration, for example clamping. A further method for integrating such functions is to laminate the label onto the component part carrier manually or in a partially automated manner using a PSA (pressure sensitive adhesive) or an OCA (optically clear adhesive). It is also known to integrate such labels on or in a plastic injection-molding compound forming the component part carrier by injection. A further method is to stamp the label onto a component part carrier with a heated stamp, wherein a thermoplastic glue is activated by the heat of the stamp to connect the label and the component part carrier. For flat and smooth glass sheets, so-called optical bonding is furthermore known, wherein an optical glue (usually called Optically Clear Resin (OCR) in these cases) is brought between two flat glass sheets or a flat glass sheet and a flat substrate in order to connect them.

However, component parts produced by means of optical bonding are severely restricted in terms of the design freedom because of the condition that they are flat glass sheets or substrates. A mechanical integration, as described at the beginning, by means of clamping of the label likewise has reduced possibilities for complex constructions or compact constructions, and an automated manufacture is difficult to implement. In the case of mechanical connections, in addition, weak points often occur because of gaps between the parts not connected in a material-bonding manner and because of corresponding relative movements and positional tolerances. Also, in the case of a manual or partially automated lamination, high positional tolerances can occur and, in particular in the case of complex geometries, it is difficult to achieve a higher degree of automation. Component parts with labels which are provided by injection in or on a plastic compound or by stamping by means of heated stamps are restricted in terms of their design freedom because of the high pressures and high temperatures required here, which can strain the component parts and for example cause mechanical bending or thermal warping. In addition, functions integrated in the label, such as sensors, are often damaged in such production methods. In addition, decorative layers possibly additionally provided in the label are also restricted in terms of the design freedom and can be damaged by the high pressures and temperatures. Furthermore, at elevated temperatures, outgassing from the plastic materials can occur and result in a formation of bubbles at boundary surfaces. At the boundary surface between label and component part carrier, moreover, small nuisance particles can already result in relatively large cavities, which in particular impair the stability and the optical appearance of the component part, because of the high-viscosity or thermoplastic adhesive layers used. Labels integrated in such production methods therefore often have defects, such as creases, bubbles, crushing of conductive tracks or the like.

The object of the present invention is thus to specify an improved method as well as an improved device for producing a component part which in particular make an automated method possible, preferably also for complex component part geometries or carrier geometries. A further object of the present invention is to specify an improved component part.

The object is achieved by means of a method according to claim 1, by means of a device according to the present invention as well as by means of a component part according to the present invention.

SUMMARY OF THE INVENTION

The object is achieved by means of a method for producing a component part, in particular a casing component part and/or an operating element and/or a display element, preferably for a vehicle interior. It is also possible for the component part to be used in other areas of application. For example, it is possible for it to be a component part, in particular a casing component part or operating element or display element, preferably for a domestic appliance (white goods), consumer electronics device, or a component part which provides operating elements and/or decorative elements of one of the named or another device. The method is is carried out by means of a device with a label receiver, a carrier receiver as well as an adhesive dispensing unit. In the method at least the following steps are carried out, preferably in the specified order of the steps or preferably with two or more of the steps in the specified order:

- a1) providing a label with a flexible layer structure, wherein the label has at least one carrier layer and has a further layer and/or one or more electrical and/or electronic and/or optical and/or optoelectronic components;
- a2) receiving the label with the label receiver;
- b1) providing a carrier;
- b2) receiving the carrier by means of the carrier receiver;
- c) applying, by means of the adhesive dispensing unit, a flowable adhesive, in one or more first defined shapes, to the label held by means of the label receiver and/or to the carrier held by means of the carrier receiver;
- d) laying the label and the carrier one on top of the other by means of a defined relative movement of the label receiver and the carrier receiver, such that the adhesive is arranged between the label and the carrier, and one or more adhesive layers, in particular in one or more second defined shapes, are obtained between the label and the carrier;
- e) at least partially curing and/or at least partially cross-linking the one or more adhesive layers.

The object is further achieved by a device, in particular for carrying out the method according to the invention, for producing a component part. The device comprises:

- a label receiver for receiving a label with a flexible layer structure, wherein the label has at least one carrier layer and has a further layer and/or has one or more electrical and/or electronic and/or optical and/or optoelectronic components;
- a carrier receiver for receiving a carrier;
- an adhesive dispensing unit for applying, by means of the adhesive dispensing unit, a flowable adhesive, in one or more first defined shapes, to the label and/or to the carrier.

The device has been has been configured such that a laying of the label and the carrier one on top of the other can be carried out and/or is carried out by means of a defined relative movement of the label receiver and the carrier receiver with an arrangement of the adhesive between the label and the carrier, and one or more adhesive layers, in particular in one or more second defined shapes, can be obtained between the label and the carrier.

The object is further achieved by a component part, in particular a casing component part and/or operating element and/or display element, preferably produced by means of the method according to the invention and/or the device according to the invention, comprising:

a label with at least one carrier layer as well as with a further layer and/or one or more electrical and/or electronic and/or optical and/or optoelectronic components; a carrier;

as well as one or more adhesive layers, which have been arranged between the label and the carrier, in particular wherein the one or more adhesive layers have been applied as a preferably flowable adhesive and preferably displaced by means of a defined relative movement of the label and the carrier and then preferably cured and crosslinked.

The object is further achieved by a system comprising the device according to the invention, in particular for carrying out the method according to the invention, wherein the method according to the invention is preferably carried out. The method is in particular implemented by computer and/or the device has been configured to carry out the computer-implemented method.

It is hereby achieved in particular that flexible labels can be applied to surfaces of in particular complex carriers, preferably of plastic or glass carriers, in a preferably automated or automatable process such that bending, warping and/or optical interference because of mechanical stresses, compressive loads and temperature loads are advantageously avoided. It is advantageously possible to carry out an automated method and/or to use a device for carrying out an automated method, wherein in particular at least the laying of the label and the carrier one on top of the other can be carried out in an automated manner or is carried out in an automated manner. By means of the high degree of automation possible or also a fully automated method, short cycle times for producing the component parts, a higher process reliability with few rejects, and resource savings can in particular be achieved. Here, in particular in the case of complex geometries of the carrier, the one or more first defined shapes of the adhesive and the defined relative movement of the label and the carrier can be matched to each other in a targeted manner, with the result that the one or more adhesive layers result from this. All steps of the method are thus preferably carried out in an automated manner and/or can be carried out in an automated manner by means of the device, wherein the one or more defined first shapes and the relative movement of the label and the carrier are matched to each other. Thus, by means of the flexible label, for example a complex shape, in particular a curved carrier with a so-called “2.5D” shape, can be coated. As the carrier here can additionally also have 3D shapes, for example because of frames or catches or other structures on the surface which would prevent a conventional integration, such as in the case of optical bonding, a particularly high degree of design freedom is achieved.

In addition, it has surprisingly been shown that, owing to the laying of the label and the carrier one on top of the other, in particular owing to a displacement of the flowable adhesive taking place in the process, unevennesses in the surface of the label and/or of the carrier are advantageously filled with adhesive, and air bubbles in the adhesive are sealed or pushed away. For this, the laying of the label and the carrier one on top of the other can comprise a pressure exerted on the label and the carrier and the flowable adhesive arranged in between and/or a relative movement between the label and the carrier and the flowable adhesive arranged in between. Thus, even narrow radii of curvature can be filled particularly deeply by means of the flowable adhesive and nuisance particles can be particularly tightly enclosed. At the same time, by means of the defined relative movement and the defined shape of the adhesive, a uniform distribution of the adhesive for shaping the one or more adhesive layers can be achieved, without air inclusions forming—for example when subareas of the adhesive merge or because of unevennesses on a surface of the label or of the carrier. A squeezing of the adhesive out at the sides of the label can advantageously also be reduced or avoided, in particular with the result that a curing can be effected with little to no additional cleaning effort. By means of the absent or reduced heating, the process where for example plastics used for the carrier release moisture and cause bubbles in an adhesive layer is moreover avoided or curtailed.

At the same time the formation of bubbles due to outgassing is further prevented, as the one or more adhesive layers, which can be processed at low temperatures, can act as a gas barrier because of the materials that can be used and the condition, such as in particular a crosslinked state. Optical and mechanical properties can thus be improved. Furthermore, stable materials can be used for the glue, with the result that for example the composite consisting of carrier, crosslinked glue and label has a higher mechanical stability than for example a thermoplastic glue or a “soft” glue, such as a self-adhesive OCA (optically clear adhesive).

By a label is meant in particular a substantially two-dimensional object. A label preferably serves to coat a carrier, and/or the circumference of the label, preferably when viewed perpendicular to a plane spanned by the label, has preferably already been formed, in particular cut out, completely or predominantly corresponding to the shape of this coating during the provision of the label. A label preferably has a flexible layer structure.

By a flexible layer structure is meant in particular that the label is bendable, preferably elastically bendable. The flexibility can be determined in particular by the elastic modulus (E modulus). The E modulus is in particular a material constant from materials engineering which describes the proportional relationship between stress and strain during the deformation of a solid body in the case of linearly elastic behavior. The E modulus is preferably determined according to the ISO standard 527-1:2019-12 (Plastics—Determination of tensile properties—Part 1: General principles, issue date 2019-12) and specified in particular in $N/mm^2$ or MPa. In particular, the label has E moduli in a range of from 500 MPa to 5,000 MPa, preferably in a range of from 1,000 MPa to 4,500 MPa, particularly preferably in a range of from 1,500 MPa to 3,000 MPa. In particular, the label is rather called “tough material”.

The E moduli are preferably present at least in subareas of the label, in particular with the result that the label as a whole is flexible and/or bendable. It is possible for the label, in particular in addition to the flexible layer structure, not to be flexible in areas and/or to have, in areas, components, such as in particular the one or more electrical and/or electronic and/or optical and/or optoelectronic components, which are not flexible and/or are not layered, i.e. preferably have higher E moduli than the subareas of the label with the above-named E moduli.

Terms such as “first”, “second” or “third” are only used for differentiation. For example, a first layer and a second layer can be present, but the presence of a first layer is not a prerequisite for the presence of a second layer.

The component part is in particular a casing component part, preferably a motor vehicle casing component part, such as for example a vehicle interior casing part or a vehicle exterior casing part. The component part can also be for example an operating element and/or a decorative element and/or a display element, in particular in the field of white goods or other domestic appliances or also in devices of consumer goods or automation technology.

By carrier is meant for example a self-supporting and/or rigid body. The carrier comprises or preferably consists of glass and/or plastic. In particular, before or during its provision the carrier already has a shape which the carrier also has in the produced component part. The shape of the carrier can in particular be three-dimensional, preferably during step b1) and/or step d) and/or in the finished component part. The carrier comprises or is in particular rather a "brittle-hard material". In particular, the carrier, preferably at least in areas or everywhere, has E moduli of 5,000 MPa or more. Preferably, the carrier is not or is substantially not deformed, in particular not plastically deformed, during the method or at least during the laying of the label and the carrier one on top of the other. For example, the carrier comprises an injection-molding compound. In particular, the carrier has been or is produced by means of injection molding. It is also possible for the carrier to have one or more decorative plies, which have been or are applied for example by means of in-mold decoration (IMD) or in-mold labeling (IML), thus in particular during an injection-molding process. The carrier is preferably a faceplate, for example of a vehicle interior part.

The carrier can also not be decorated or alternatively can have been or be decorated using any desired decoration method such as for example wet painting, vapor deposition, chemical vapor deposition (CVD), physical vapor deposition (PVD), film decoration, etc. In particular in a preferred embodiment wherein the further layer is or comprises an electrically conductive functional layer and/or the label preferably comprises a capacitive touch sensor, it is expedient that the carrier and possible coatings and/or decorative layers on the carrier are not electrically conductive. Alternatively or additionally, it is possible for the carrier to be transparent or translucent completely or in areas, in particular in areas which are provided for operation. This is advantageous in particular in the case of component parts in the form of operating elements.

The further layer is or comprises in particular an electrically conductive functional layer. The electrically conductive functional layer is preferably electrically contactable in the provided label and/or the produced component part. The electrically conductive functional layer preferably has an electrical and/or electronic and/or optical and/or optoelectronic function, for example a sensor function (for example for temperature, moisture, pressure, electrical capacitance, visible and/or invisible electromagnetic wavelengths (for example IR, visible light and/or UV), electrical resistance and/or chemicals), and/or a touch sensor function, a heating function, a cooling function and/or an actuator function. The carrier layer and the electrically conductive functional layer have preferably been comprised of or formed by a sensor film, in particular a touch sensor film.

The one or more first defined shapes have been or are determined in particular by a relative movement between the adhesive dispensing unit and the label and/or carrier and/or by the amount of adhesive dispensed by the adhesive dispensing unit and/or by the viscosity of the adhesive. The one or more second defined shapes have been or are determined in particular by the one or more first defined shapes and deformation brought about by the laying of the label and the carrier one on top of the other. A surface of the carrier, in particular at least one smooth surface and/or a 2.5D surface of the carrier, preferably has been or is coated by the one or more second defined shapes, preferably coated over the whole surface and/or over a large area, for example except for a defined distance from the edge of the surface. A 2.5D surface or 2.5D shape is characterized in particular by a cylindrical bending or curvature. It is also possible for the adhesive to be deformed because of a movement of the label receiver, for example toward the carrier receiver, in particular wherein this deformation has been or is taken into account for carrying out the defined relative movement of the label receiver and the carrier receiver. The one or more second defined shapes preferably have an edge which overlaps with an edge of the label or has a determined distance therefrom. This overlap can be present in areas or be present completely and/or be present in a subarea in which the label has an edge which overlaps with the carrier in the component part.

By displaced or displace is meant in particular that the adhesive has been or is displaced out of an area which has been or is formed by the one or more first defined shapes into further areas, preferably wherein adhesive likewise remains in the area which has been or is formed by the one or more first defined shapes.

By curing is meant in particular a crosslinking, preferably linking of chains. During crosslinking, preferably linking of chains, in particular a three-dimensional network of crosslinked polymer chains is formed. During linking of chains, in particular already existing and/or previously formed polymer chains are crosslinked. The adhesive is in particular cured, preferably completely cured, when the viscosity of the adhesive at room temperature, for example of 20° C., is greater than 50,000 mPa·s, preferably greater than 100,000 mPa·s. The adhesive with such viscosities is preferably no longer flowable. By completely cured is meant when more than 90% of the polymer constituents of the adhesive that are capable of crosslinking have a crosslinking. A completely cured adhesive is present when a complete (>90%) crosslinking of its polymer constituents has been effected.

By a layer or ply is preferably meant a substantially two-dimensional object. It is possible for a layer to be present over the whole surface or partially, in particular patterned. A layer can itself be single-layered or be multilayered.

By pattern or patterned is meant for example individually or in combination patterns of dots and/or lines, in particular straight and/or curved lines, bone structure, T shape, Y shape, I shape, U shape, serpentines, nodes, branches, fractal shapes. A layer provided over part of the surface can in particular have been or be provided patterned. A pattern can also be a motif, preferably selected individually or in combination from: geometric shape, guilloche, endless pattern, image, symbol, logo, emblem, portrait, alphanumeric character, QR code, barcode. A motif can be present as a single image and/or as an endless pattern.

The provision of the label can be effected for example manually and/or on a receiving surface provided for it and/or by means of a first feed device, for example comprising one or more conveyor belts and/or one or more robot grippers. The provision of the carriers can be effected for example manually and/or on a receiving surface provided for them and/or by means of a second feed device, for example comprising one or more conveyor belts and/or one or more robot grippers.

The order of the steps of the method can be chosen as desired. Several steps can be effected one after another and/or several steps of the method can also be carried out at the same time. Step a1) is in particular carried out before step a2) and step b1) is in particular carried out before step b2). Step c) is preferably carried out after step a2). Step c) and step b2) can be carried out at least partially at the same time. It is also possible for step c) to be carried out before and/or after step b2). Step d) is preferably carried out after step c). Step e) is preferably carried out after step d).

Advantageous designs of the invention are described in the dependent claims.

It is possible for there to be pressures and/or temperatures resulting from the method, in particular from the defined relative movement and/or from curing and/or crosslinking mechanisms of the adhesive, in particular without the pressures and/or temperatures adopting preset and/or measured and/or controlled values. However, the resulting pressures and/or temperatures are advantageously comparatively low. It is possible for example that, to distribute the adhesive, no application of a pressure, in particular substantially no application of a pressure, or by a preferably low pressure, is exerted on the adhesive by the carrier and/or the label and/or a heating of the adhesive, and in particular of the carrier and/or of the label, takes place as a result of an irradiation of the adhesive and/or an exothermic reaction of the adhesive.

It is also possible for an exerting of a defined pressure and/or a defined heating of label, adhesive and carrier and/or a setting of a defined temperature range of label, adhesive and carrier to have been carried out and/or to be settable by means of the device, preferably during the laying of the label and the carrier one on top of the other.

Through corresponding resulting and/or defined pressures and/or temperatures, the flowability of the adhesive can in particular be utilized and/or optimized and damage or warping due to temperatures that are too high or pressure that is too high can be reduced.

During the method, in particular the laying of the label and the carrier one on top of the other, the carrier, the label and/or the adhesive preferably do not exceed a temperature which corresponds to a glass transition temperature of a material of the carrier, of the label and/or of the adhesive. A heating of the carrier and/or of the label or subareas thereof expediently takes place to temperatures which are lower than the glass transition temperatures of the materials used. In the case of PET-based films, which act in particular as a carrier layer of the label, the heating takes place for example to less than 80° C., or a temperature of 80° C. or more does not arise during the method. It is thus possible for the label, the adhesive, the one or more adhesive layers and/or the carrier to be processed at a temperature of less than 80° C., preferably of at most 60° C., during the method, in particular the laying of the label and the carrier one on top of the other. It is also conceivable that, in particular in step d), a cooling of carrier and/or label is carried out, for example if the adhesive is self-curing with an exothermic reaction. Low temperatures are advantageous in particular as a negative influencing of label and/or carrier, e.g. by a softening of the label that is too great or a bending of the carrier, can thus be avoided.

The label, the adhesive, the one or more adhesive layers and/or the carrier are preferably heated to a temperature of at most 100° C., preferably at most 80° C., for at most 30 s, preferably at most 15 s. During the method, in particular during the laying of the label and the carrier one on top of the other, the label, the adhesive, the one or more adhesive layers and/or the carrier preferably do not exceed a temperature of 80° C., preferably of 60° C., or in particular exceed it for at most 60 s, preferably at most 30 s, preferably at most 15 s.

The method is preferably carried out and/or the device has been designed such that, in particular after the defined relative movement has been carried out, holding of the label receiver and/or of the carrier receiver with a defined relative position of the label receiver and the carrier receiver is carried out or can be carried out. The holding is preferably a substep of step d), i.e. the laying of the label and the carrier one on top of the other. The defined relative movement is preferably carried out to distribute the adhesive, in particular wherein a pressure is exerted on the adhesive or acts on the adhesive, which is sufficient to distribute adhesive without it emerging between the label and the carrier at an edge. The holding is carried out in particular to at least partially cure and/or crosslink the distributed adhesive. The holding is carried out in particular until the label has been fixed to the carrier, for example by a sufficient curing and/or crosslinking by means of step e). The holding is effected in particular for at most 240 s, for example if the adhesive is self-curing, preferably for less than 60 s, preferably for less than 10 s, for example if the adhesive is radiation-curing, in particular UV-radiation-curing and/or cures by visible light.

In particular, the method is carried out and/or the device has been designed such that the defined relative movement and/or the holding is carried out, wherein a pressure which does not exceed 200 $N/cm^2$ and/or lies in a range of from 0.1 $N/cm^2$ to 200 $N/cm^2$ is exerted or acts on the label, the adhesive, the one or more adhesive layers and/or the carrier, and/or without a pressure which is 200 $N/cm^2$ or more being exerted on the label, the adhesive, the one or more adhesive layers and/or the carrier. It is alternatively or additionally possible for a pressure which does not exceed 10 $N/cm^2$ or exceeds it for at most 10 s to be exerted or to act on the label, the adhesive, the one or more adhesive layers and/or the carrier, in particular during the laying of the label and the carrier one on top of the other.

The label receiver preferably has a receiving surface and/or a receiving mold for receiving the label. Preferably, the receiving mold is curved at least in areas and/or is a fitted shape adapted to the label, and in particular to a shape, preferably curved shape, of the label to be formed on the carrier. The shape of the receiving mold and/or of the receiving surface is preferably adapted to the shape of the label because the label receiver has at least one indentation with at least one edge which delimits the at least one indentation. The edge is used in particular for positioning the label on the label receiver.

The label is preferably flat but flexible, in particular in step a1) and/or before step a2). The receiving surface of the label receiver is preferably curved at least in areas and in step a2) the label is forced, in particular via vacuum or mechanical holders, to adopt the shape, curved at least in areas, of the receiving surface.

The label receiver and/or the carrier receiver preferably has means for holding the label and/or the carrier, in particular selected individually or in combination from: means for generating a vacuum, in particular for suctioning the label and/or the carrier, a clamping device, a spacer, an indentation, a screw joint, a magnetic holder, a vacuum holder.

It is possible for the label to be curved by being received by means of the label receiver. Expediently, at least one curvature area of the label receiver, which is in contact with the label after receiving the label, has a curved surface. The carrier preferably has a curved carrier surface at least in a curvature area, in particular wherein a curvature area of the label is preferably applied to the curvature area of the carrier during the laying of the label and the carrier one on top of the other. The curvature area of the label receiver preferably has a curved surface corresponding to the curvature area of the carrier, in particular such that the label has been or is curved when the label is received with the label receiver such that a curved label surface corresponding to the curved carrier surface, preferably a complementary curved label surface, has been or is formed in the curvature area of the label. It is also possible for the label to have for example a curved surface which has been or is adapted to an entirety of curvatures, indentations and/or elevations of the carrier. Thus, it is also possible for example for one or more elevations and/or indentations which are present in the carrier to have been or to be filled by through a variation in layer thickness of the one or more adhesive layers. It is possible in particular for the carrier in the component part to have a curved surface and/or elevations and/or indentations on a surface facing the label, in particular wherein the one or more adhesive layers have a variation in layer thickness following the curved surface and/or the elevations and/or the indentations.

A curved surface, in particular the label surface, the carrier surface and/or the curved surface of the label receiver, has in particular one or more of the following properties or is formed by them: a minimum radius of curvature of 10 mm, preferably of 20 mm, preferably of 50 mm, particularly preferably of 200 mm, one or more indentations, one or more elevations, a radius of curvature that varies over the curved surface.

It is also possible for the carrier, preferably inside and/or outside the curved surface of the carrier, preferably inside and/or outside the curvature area of the carrier, to have one or more catches, one or more frames and/or one or more elevations and/or indentations, preferably one or more additional elevations and/or indentations, which have in particular a height of at most 100 mm, preferably of at most 50 mm, further preferably of at most 20 mm, and/or to have one or more recesses.

In addition, it is possible for the carrier to have at least one smooth area, as an alternative or in addition to the curvature area of the carrier. As an alternative or in addition to the curvature area of the label, the label can in particular have at least one smooth area, with which the label is applied to the smooth area of the carrier, in particular during the laying of the label and the carrier one on top of the other. In particular, it is also possible for at least one smooth area of the label receiver to be in contact with the label after receiving the label, preferably wherein the at least one smooth area of the label receiver and/or of the label has been or is allocated to the at least one smooth area of the carrier. By “smooth area” is meant here in particular that a smooth surface, in particular without curvature, is present inside the smooth area. It is alternatively or additionally possible for the surface of the carrier to have a slightly curved surface, which has a radius in a plane which is larger than 100 mm. It is also possible for the carrier to have one or more areas which are raised and/or sunken compared with the smooth surface and/or the slightly curved surface.

By area is meant in particular in each case an area predefined by a defined surface area which is occupied when viewed in a top view onto the label, the carrier, the adhesive, the one or more adhesive layers, the label receiver and/or the carrier receiver, and/or when viewed perpendicular to a plane formed by the label, the carrier, the adhesive, the one or more adhesive layers, the label receiver and/or the carrier receiver.

The defined relative movement of the label receiver and the carrier receiver is matched in particular to the surface, preferably the curved surface of the label and/or of the carrier, as well as preferably the one or more defined shapes of the adhesive. In particular, the curved surface of the label is unrolled on the curved surface of the carrier. Preferably, the defined relative movement of the label receiver and the carrier receiver is implemented and/or the label receiver has been designed such that no bending and/or no curvature of the label takes place during the defined relative movement.

It is also possible for at most 0.5 s to 60 s, preferably 0.5 s to 20 s, to pass after the application of the adhesive by means of the adhesive dispensing unit and before the laying of the label and the carrier one on top of the other (s=seconds). The label receiver, the carrier receiver and the adhesive dispensing unit preferably have a maximum distance from each other of 2 m. An undesired flowing of the adhesive can advantageously hereby be avoided because there is a short period of time for undesired flowing of the adhesive, and sufficient time for an acceleration of the adhesive that is not too great is guaranteed during the positioning for the laying of the label and the carrier one on top of the other. The period of time can be reliably determined and complied with using an automated method.

It is preferred that the adhesive and/or the one or more adhesive layers comprise or consist of a cold glue. In particular, the adhesive is or comprises an optical glue and/or the one or more adhesive layers are or comprise one or more optical glues. By an optical glue is meant in particular that, in particular in the cured state, the transmittance is at least 50%, preferably at least 80%, and/or the optical glue is crystal clear transparent and/or the adhesive is colorless and/or the glue is free of one or more of the following materials: fillers, dyes, color pigments.

The application of the adhesive is effected to a surface, in particular at least in the curvature area, of the label and/or to a surface, in particular at least in the curvature area, of the carrier in particular over part of the surface, preferably patterned, or over the whole surface. The application of the adhesive is preferably effected by dispensing, in particular with a volumetric metering of the adhesive, or by printing, in particular by digital printing and/or screen printing. It is possible for the adhesive dispensing unit to have been comprised of or to have been formed by a printing device, in particular a digital printing device and/or a screen printing device and/or a dispenser. The adhesive dispensing unit preferably comprises one or more nozzles and/or channels and/or dispensers for dispensing the flowable adhesive. In particular, the adhesive dispensing unit comprises one or more printheads, preferably inkjet printheads. In particular, for example a depositing of the adhesive over the whole surface and/or over a large area can be carried out or is carried out by means of screen printing.

It is possible for the adhesive and/or the one or more adhesive layers to be curable, to have been cured or to be cured, selected individually or in combination from: by means of radiation, preferably UV radiation and/or visible light and/or IR radiation, by means of physical curing, by means of chemical curing, by means of dual curing. In particular, the method for producing the component part is designed and/or the device is configured such that the adhesive is crosslinkable or is crosslinked and/or the one or more adhesive layers are crosslinkable and/or have been or are crosslinked. It is possible in particular for the adhesive and/or the one or more adhesive layers to be crosslinkable, to have been crosslinked or to be crosslinked in particular by means of UV radiation and/or visible light.

It is possible for the adhesive to have a viscosity in a range of from 0.5 mPa·s to 100,000 mPa·s, in particular from 1 mPa·s to 100,000 mPa·s, preferably from 300 mPa·s to 50,000 mPa·s, preferably from 1,000 to 10,000 mPa·s and/or from 500 mPa·s to 2,000 mPa·s, preferably 1,000 mPa·s to 1,500 mPa·s, during the application of the adhesive. During the application of the adhesive and/or during the laying of the label and the carrier one on top of the other, the adhesive has Newtonian or shear-thinning fluid properties in particular. The fluid properties, in particular the viscosity, preferably has been or is designed such that during the laying of the label and the carrier one on top of the other a flowing of the adhesive is possible and/or the one or more first defined shapes of the adhesive are preserved or are deformed in a controlled manner until the label and the carrier have been laid one on top of the other. In particular, an automatable positioning of the adhesive and preferably a largely uniform distribution of the adhesive over the surface area of the label and/or of the carrier, in particular after the label and the carrier have been laid one on top of the other, can be obtained.

The viscosity, in particular the dynamic viscosity, here is preferably specified for a state of the adhesive which exists before the adhesive is delivered to the adhesive dispensing unit and/or while the adhesive is being applied to the label and/or the carrier. In the case of the viscosity, in particular dynamic viscosity, specified in the above range it can in particular also be an average value, around which tolerance values vary in particular. Such a viscosity guarantees in particular an optimum wetting of the label and/or of the carrier. A viscosity that is too low can for example result in an undesired running of the adhesive before the laying of the label and the carrier one on top of the other and a viscosity that is too high can for example result in a poor or insufficient flowing of the glue during the laying of the label and the carrier one on top of the other.

The viscosity of the adhesive is in particular measured, preferably by means of a viscometer, preferably according to the ISO standard 3219, further preferably according to DIN EN ISO 3219-1:2021-08 (Rheology—Part 1: Vocabulary and symbols for rotational and oscillatory rheometry, issue date 2021-08) or according to DIN EN ISO 3219-2:2021-08 (Rheology—Part 2: General principles of rotational and oscillatory rheometry, issue date 2021-08). The adhesive has preferably been formed such that it falls below its yield point at least after the application to the label and/or the carrier and/or before the laying of the label and the carrier one on top of the other and/or the adhesive remains in the one or more first defined shapes after the application by means of the adhesive dispensing unit and preferably does not or does not substantially change its shape, preferably until the yield point is exceeded again during the laying of the label and the carrier one on top of the other. A uniform distribution between the label and the carrier can thus be achieved, without adhesive running out of the label and/or the carrier at an edge.

It is possible for the one or more first defined shapes of the adhesive to have cross-section dimensions, in particular diameter, in a range of from 50 μm to 5,000 μm, preferably in a range of from 500 μm to 3,000 μm. It is also possible for the adhesive to be applied with a width in a range of from 100 μm to 10,000 μm, preferably in a range of from 1,000 μm to 6,000 μm. The width is preferably measured in a top view and/or when viewed perpendicular to a plane spanned by the label and/or the carrier. Thus, a sufficient flow during the laying of the label and the carrier one on top of the other can preferably be achieved.

The adhesive preferably has been or is applied over the whole surface and/or over part of the surface, preferably patterned. It is possible in particular for the first defined shapes of the adhesive to have one or more of the following shapes: straight and/or curved lines, bone structure, T shape, Y shape, I shape, U shape, serpentines, nodes, branches, fractal shapes.

It is possible for the one or more first defined shapes to be formed by one or more first layers of the adhesive which have been or are applied over the whole surface and/or over part of the surface. During the laying of the label and the carrier one on top of the other it is possible for a displacement of the adhesive to result in a greater surface coverage and/or a surface coverage over the whole surface of the label and/or of the carrier with adhesive. The one or more adhesive layers are in particular obtained therefrom. The laying of the label and the carrier one on top of the other is preferably effected such that the one or more adhesive layers are arranged with a minimum thickness of 2 μm, preferably 3 μm, between the label and the carrier. The component part preferably has a minimum thickness of the one or more adhesive layers of 2 μm, preferably 3 μm. Preferably, the one or more adhesive layers in the component part have a thickness in a range of from 2 μm to 150 μm, preferably from 3 μm to 50 μm. The defined relative movement preferably can be carried out and/or is carried out such that the one or more adhesive layers are arranged with a thickness of at least 2 μm, in particular in a range of from 2 μm to 200 μm, preferably from 3 μm to 50 μm, between the label and the carrier. It is also possible for the layer thickness of the one or more adhesive layers preferably to lie in a range of from 1 μm to 1 mm, preferably in the range of from 50 μm to 250 μm. The one or more adhesive layers preferably have a thickness which is at least 30% greater than the height or depth of structures to be compensated for in each case. Structures to be compensated for in each case can in particular be elevations and/or indentations of the carrier which are to be provided or are provided with the label and/or the adhesive and/or the one or more adhesive layers. By “at least 30% greater” is meant in particular that the thickness of the one or more adhesive layers is at least 1.3 times the height and/or depth of these elevations and/or indentations. Through a minimum thickness of the adhesive layer(s), it can advantageously be guaranteed that nuisance particles are enclosed by the one or more adhesive layers.

For example, the adhesive is deposited in the shape of “beads”. In particular, if the adhesive is deposited partially, preferably patterned. For example in the case of adhesive in the shape of a bead, a viscosity of the adhesive in a range of from 500 mPa·s to 2,000 mPa·s is advantageous. This makes it possible in particular for the adhesive to be able to be applied well and to remain stable until the label and the carrier have been laid one on top of the other. By bead is meant in particular a shape with a substantially circular or elliptical cross section.

The application of one or more layers of the one or more adhesive layers to the label is advantageously effected onto a surface of the label that is easy to coat as it is for example flat or has been uniformly bent. In particular, the label has a 2.5D shape. The carrier and/or the component part has in particular a 2.5D surface to be coated, but also a 3D shape, in particular because of elevations, indentations, catches and/or frames. An expediently particularly uncomplicated depositing of adhesive can thus be carried out. In particular a smaller mass of the label compared with the carrier as well as a better ability to be handled can also be advantageous here.

It is possible that in step c) one or more first layers of the adhesive are applied to the label partially, preferably patterned, and one or more second layers of the adhesive are applied to the carrier over the whole surface and/or over a large area or one or more first layers of the adhesive are applied to the carrier partially, preferably patterned, and one or more second layers of the adhesive are applied to the label over the whole surface and/or over a large area.

It is also possible for the layer thickness of the one or more first defined shapes to be greater, at least in areas, than the layer thickness of the one or more second defined shapes and/or for, in a top view, the area of the one or more first defined shapes to be greater than the area of the one or more second defined shapes. The surface density of the first defined shapes relative to the surface area covered with the one or more adhesive layers after the label and the carrier have been laid one on top of the other is in particular less than 90%, preferably less than 80%. It is expedient that the surface density of the one or more first shapes is at least 5%.

The method is preferably carried out and/or the device is configured such that the adhesive is deposited inside one or more first areas of the label and/or of the carrier for each area of the one or more first areas in particular in an initial area and in a following area, wherein during the laying of the label and the carrier one on top of the other a contact of the label, the adhesive and the carrier is produced in the initial area first and then, in particular lastly, in the following area. The adhesive in the one or more first defined shapes advantageously has a higher surface density in the initial area than in the following area. It is also possible for an intermediate area to have been or to be arranged between the initial area and the following area. The surface density of the glue in the first defined shape is preferably greater in the initial area than in the intermediate area and/or in the following area. The surface density in the first defined shape is preferably greater in the intermediate area than in the following area. However, it is also possible for the surface density in the first defined shape to be greater in the following area than in the intermediate area. The surface density of the one or more first defined shapes preferably decreases from the initial area toward the following area at least in areas.

Depending on the geometry of the label and the carrier as well as for example the demands on the adhesive surfaces, the flowing of the glue while the label and the carrier are being brought together can thus be optimized. The one or more first defined shapes can be determined for example empirically and/or by simulation. The shape is in particular to be chosen such that, after the label and the carrier have been laid one on top of the other and in particular in the produced component part, a preferably uniformly distributed adhesive layer without bubbles is distributed over the complete surface area of the carrier provided with the label.

The surface density is preferably calculated when viewed perpendicular to a plane spanned by the label and/or the carrier. The surface density is preferably calculated from the area of a surface area covered by adhesive in the first defined shape in relation to the surface area of the label and/or of the carrier which is provided with the adhesive in the second defined shape or with the one or more adhesive layers after the label and the carrier have been laid one on top of the other.

The initial area can be formed for example by a proportion of at most 20%, preferably of at most 10%, of the total surface area of the label which has a connection of label, adhesive and carrier in the respective first area first. The following area can be formed for example by a proportion of at least 80%, preferably of at least 90%, of the total surface area of the label which has a connection of label, adhesive and carrier in the respective first area last. The one or more first defined shapes can in particular also not be provided in the following area and adhesive can first be distributed by being displaced thereto. It is conceivable that there is only one first area, as is illustrated by way of example by FIG. 6.

It is also possible for the adhesive with the one or more first defined shapes to have been or to be applied with a distance of at least 1 mm, preferably at least 2 mm, from an outer edge and/or from an outer rim of a surface of the label and/or of the carrier to which the adhesive is applied and/or from an edge of an opening inside the label and/or the carrier.

A “squeezing out” of a gap formed by the label and the carrier can thus preferably be avoided.

It is also conceivable that the adhesive is applied exclusively to the label or that the adhesive is applied to the label over a large area and is applied to the carrier over a small area or is applied to the label over a small area and is applied to the carrier over a large area. By “over a large area” and “over a small area” is preferably meant that the area of the surface area covered with adhesive over a large area is greater than the area of the surface area covered with adhesive over a large area. For example, a large-area application of the glue can have been or be carried out on the carrier or the label, wherein one or more contact regions, in particular contact points, have been or are applied to the respectively other part out of the carrier or the label. The contact points have in particular an area of at most 20 $cm^2$, preferably at most 4 $cm^2$, in particular when viewed perpendicular to a plane spanned by the carrier and/or the label.

An advantage of applying the adhesive to the label is in particular that the label typically has a less complex surface geometry and in particular has been designed relatively flat and light. An application to the carrier can be designed more difficult, in particular if the latter has a 3D shape, possibly with an edge. However, it can also be advantageous to provide the contact regions in particular areas of the carrier or of the label, in order to avoid accumulations of adhesive on the respectively other part, which can result for example in a stronger flowing during handling, and/or in order to optimize the relative movement of the label and the carrier together with the amount of adhesive with respect to a displacement of the adhesive.

It is also possible for the adhesive to be applied to the label and a primer to have been or to be applied to the carrier or for a primer to have been or to be applied to the label and the adhesive to be applied to the carrier. The primer is in particular applied to a side or surface area to be provided with adhesive. The primer preferably has been or is applied partially or over the whole surface. The primer has preferably been chemically matched to the adhesive. A primer is in particular also called an adhesion promoter or “tie coat”. The primer has been or is in particular deposited as a layer.

It is possible for one or more first layers of the one or more adhesive layers and/or for the adhesive deposited for these layers to have or to consist of a varnish that can be dispensed, preferably to have or to consist of a UV dispensing varnish. The adhesive dispensing unit preferably has one or more dispensers and/or one or more volumetric dosimeters, by means of which such a dispensing varnish preferably is printable or is printed. In particular, the method for producing the component part is designed and/or the device is configured such that one or more first layers of the one or more adhesive layers are applied with the one or more dispensers. It is further possible for one or more layers of the one or more adhesive layers to be crosslinkable or to have been or to be crosslinked, in particular by means of radiation, preferably with visible light and/or with UV radiation. The one or more dispensers expediently have been or are matched to the respective adhesive layer, in particular its viscosity, fillers, processing temperature and/or amount deposited.

It is possible for one or more first layers of the one or more adhesive layers and/or for the adhesive deposited for these layers to have or to consist of a digital printing ink, preferably to have or to consist of an inkjet printing ink, preferably a UV inkjet printing ink. The adhesive dispensing unit preferably has one or more inkjet printheads, by means of which such an inkjet printing ink preferably is printable or is printed. In particular, the method for producing the component part is designed and/or the device is configured such that one or more first layers of the one or more adhesive layers are applied with a digital printing method, preferably an inkjet printing method, preferably a UV inkjet printing method. It is further possible for one or more layers of the one or more adhesive layers to be crosslinkable or to have been or to be crosslinked, in particular by means of radiation, preferably with visible light and/or with UV radiation. Adhesive layers in the form of an inkjet printing ink have been or are applied preferably with a viscosity in a range of from 0.5 mPa·s to 100 mPa·s, advantageously 8 mPa·s to 30 mPa·s.

It is conceivable that alternatively or additionally one or more layers of the one or more adhesive layers have been or are applied by means of gravure printing and/or screen printing. It is thus also possible for one or more layers of the one or more adhesive layers of the total structure, in particular of the one or more defined shapes, to comprise a gravure printing ink and/or a screen printing ink. It is furthermore also conceivable that, in addition to radiation curing properties, in particular UV curing properties and/or curing properties brought about by visible light, one or more layers of the one or more adhesive layers also have properties of thermal curing, self-curing and/or curing by crosslinking due to a multi-component system. The one or more adhesive layers preferably have a sufficiently high viscosity during the depositing in order that the shape of the glue is largely preserved during the process, until the label is applied to the component part. For example, the adhesive and/or the adhesive deposited for one or more layers of the one or more adhesive layers has Newtonian and/or shear-thinning fluid properties.

The adhesive and/or the one or more adhesive layer(s) obtained therefrom or one or more layers thereof preferably have been or are formed from the class of polyacrylates and/or polymethacrylates, polyurethanes, in particular from the group of polyester polyols, polyether polyols, polycarbonate polyols, polyacrylate polyols and/or combinations of these polymers, polyesters, polyethers, polyolefins, epoxy resins and/or from derivatives of the abovenamed. These formulations can in particular be both uncrosslinked and further have been or be crosslinked, preferably by isocyanates, carbodiimides, melamines and/or aziridines and/or derivatives of the named compounds.

The adhesive and/or the one or more adhesive layer(s) obtained therefrom or one or more layers thereof can further in particular have been or be constructed from radiation-curing substances, in particular radiation-curing acrylates and/or methacrylates, comprising or consisting of polyacrylic acrylates, polyurethane acrylates, polyester acrylates, polycarbonate acrylates and/or polyether acrylates and/or copolymers of the abovenamed. The radiation-curing formulations, in particular the radiation-curing acrylates and/or methacrylates, are preferably oligomers here. An oligomer is in particular a molecule with a number of monomers in a range of from 2 to 100. A polymer is in particular a molecule with a number of monomers starting from 101.

The adhesive and/or the one or more adhesive layer(s) obtained therefrom or one or more layers thereof preferably contain, in particular in addition to the named polyacrylates, further UV-curable acrylate monomers and/or methacrylate monomers, and/or are produced therefrom. Depending on the embodiment, these monomers in particular contain one or more acrylate groups and/or preferably further side groups such as e.g. alkyl, aryl, cycloalkyl, cycloalkylaryl, alkoxyalkyl, alkoxyaryl, thionyl, thionylaryl, cyclothionyl, cyclothionylaryl, alkoxythionyl, cycloalkoxythionyl, alkoxycyclothionyl, cycloalkoxycyclothionyl, alkoxythionylaryl, cycloalkoxythionylaryl, alkoxycyclothionylaryl and/or cycloalkoxycyclothionylaryl groups. In particular, specific varnish properties can be set hereby, such as e.g. the viscosity and an optimized formation of the three-dimensional network during the radiation curing. Through the selection of the monomers or combinations of them further properties, such as e.g. the surface hardness or residual tack (usually referred to by the term "tackiness"), of the one or more adhesive layers can in particular be controlled in a targeted manner.

In the finished component part, the one or more adhesive layers preferably comprise or preferably consist of correspondingly radiation-cured, in particular UV-radiation-cured and/or visible-light-cured, substances.

The adhesive and/or the one or more adhesive layer(s) obtained therefrom or one or more layers thereof can, in particular in the sense of a combination of the abovenamed, consist of or have been or be produced from a radiation-curing dual cure varnish. Dual cure varnishes can consist of different polymers or oligomers, which have unsaturated acrylate groups and/or methacrylate groups. These functional groups can in turn be radically crosslinked with each other in the radiation-curing step. For the thermal pre-crosslinking in the first step, at least two or more alcohol groups are preferably also used in the case of these polymers or oligomers. These alcohol groups can in particular be crosslinked with multifunctional isocyanates or melamine formaldehyde resins. Various UV raw materials such as epoxy acrylates, polyether acrylates, polyester acrylates and in particular polyacrylic acrylates come into consideration for example as preferably unsaturated oligomers, polymers or dendrimers. In particular, blocked and/or unblocked representatives based on TDI (TDI=toluene-2,4-diisocyanate), HDI (HDI=hexamethylene diisocyanate) or IPDI (IPDI=isophorone diisocyanate) are used as isocyanate. The melamine crosslinkers can come from the group of the fully etherified, the imino types and/or the benzoguanamines.

The adhesive and/or the one or more adhesive layer(s) obtained therefrom or one or more layers thereof can in particular also have been or be equipped with fillers such as for example HDS (highly dispersed silica) for the optimization of rheological properties.

The one or more adhesive layers preferably contain so-called initiators, in particular UV initiators, in particular for the initiation of the radiation curing, if this is in particular a UV-radiation curing. The UV initiators are preferably selected from the class of the α-alkoxy, α-hydroxy or α-amino-aryl ketones and/or the class of the acyl phosphine oxides and/or polymer-bound variants of these above-named classes. Acyl phosphine oxides are preferably used in combination with dispensers, UV inkjet printing, flexographic printing, pad printing or screen printing of the one or more adhesive layers, in particular because of their particularly suitable absorption properties in the UV LED range.

In particular for the improvement of specific and typical varnish properties, such as e.g. the wetting, the flow, the foam formation etc., it is possible for the one or more adhesive layers to contain additives. For the integration of these additives into the three-dimensional network, they have for their part typically been provided with radiation-curing or thermally crosslinkable groups or combinations thereof.

It is possible that, in particular for the minimization of chain terminations during the radiation curing through reactions of the formed radicals with oxygen molecules from the air and/or for the reduction of the migration of radical chains to the layer surface, tertiary amines and/or acrylate amines, in particular so-called amine synergists, have been or are preferably added to the adhesive and/or the one or more adhesive layer(s) obtained therefrom or one or more layers thereof. In particular for the integration of these additives into the three-dimensional network, they have preferably for their part likewise been provided with radiation-curing or thermally crosslinkable groups or combinations thereof.

The method is preferably carried out and/or the device has preferably been configured such that through the defined relative movement of the label receiver and the carrier receiver the adhesive is displaced or can be displaced at least in areas from the one or more first defined shapes to the one or more second defined shapes of the one or more adhesive layers. The method is preferably carried out and/or the device has preferably been configured such that the laying of the label and the carrier one on top of the other, in particular the defined relative movement, can be carried out or is carried out through a translational and/or rotational movement of the label in relation to the carrier. The defined relative movement of the label receiver and the carrier receiver is or comprises in particular a seesawing and/or an unrolling. The defined relative movement of the label receiver and the carrier receiver is preferably carried out automatically and/or can be carried out automatically.

The method is preferably carried out and/or the device has preferably been configured such that, to carry out the defined relative movement of the label and the carrier, the label is rotated and/or is rotatable about a rotation point and/or at an angle in a range of from 0° to 45° and/or with an angular velocity of from 0.01 rad/s to 100 rad/s.

Alternatively or additionally, the method is particularly preferably carried out and/or the device has particularly preferably been configured such that, to carry out the defined relative movement of the label receiver and the carrier receiver and/or of the label and the carrier, a seesawing movement and/or an unrolling movement of the label or of the label receiver is carried out and/or can be carried out. By a seesawing movement is meant here in particular a rotational movement about a spatially fixed axis above the carrier and/or above the carrier receiver, in particular wherein there is a translational movement between the label receiver, in particular the label on the label receiver, and the carrier receiver, in particular the carrier on the carrier receiver. By an unrolling movement is meant here in particular a rotational movement with an axis of rotation above the carrier receiver, preferably above the carrier on the carrier receiver, in particular wherein the axis of rotation moves, preferably moves in the direction of an unrolling direction. Here, there is preferably no translational movement between the label receiver, in particular the label on the label receiver, and the carrier receiver, in particular the carrier on the carrier receiver. It is possible for the seesawing movement to be effected multiple times, wherein the direction of rotation alternates, i.e. in particular a seesawing back and forth is effected. It is possible for the unrolling movement to be effected multiple times, in particular wherein the direction of rotation and the translational direction of the axis of rotation alternates, i.e. wherein an unrolling back and forth is preferably effected.

It is, in particular in the case of labels with a surface area which is smaller than 100 $cm^2$, preferably smaller than 20 $cm^2$, preferably in a top view and/or when viewed perpendicular to a plane spanned by the label, conceivable to carry out the method and/or to design the device such that purely a lifting movement is carried out and/or can be carried out by the label receiver and/or the carrier receiver as the relative movement of the label and the carrier. The lifting movement is to be understood in particular as a purely translational movement. In particular, the simple structure of the device and the simple procedure are advantageous here. However, a rotational component of the movement is preferably advantageous in particular in the case of larger labels.

In particular, the device has means for carrying out the relative movement of the label receiver and the carrier receiver, which in particular comprise movable component parts, actuators for moving the component parts and means for actuating the actuators, preferably based on software commands, in particular by means of at least one storage medium and at least one processor. The defined relative movement of the label and the carrier can preferably be carried out or is carried out based on data regarding the position, attitude and/or movement of the label and/or of the carrier retrievable in particular from a storage medium. The label receiver preferably has been or is held and/or moved by means of a robot system, preferably a collaborating robot system. For this, the robot system preferably has one or more of the following components: one or more robot arms, one or more joints for the movable arrangement of the one or more robot arms, one or more actuators for moving the one or more robot arms, preferably one or more hydraulic actuators, one or more pneumatic actuators and/or one or more electric motors, preferably one or more servomotors, for moving the one or more robot arms, one or more sensors for detecting the position and/or attitude of the label receiver and/or of the one or more robot arms, a control device, in particular for storing and executing movement sequences, an interface for an operating device and/or an operating device, in particular for inputting, storing and/or retrieving the movement sequences. The one or more joints or at least one joint thereof preferably provide a rotational mobility. A translational movement can here preferably be able to be carried out or be carried out through the interaction of several rotational movements. The movement sequences can have been or be stored in the control device for example by a manual movement and/or manual positioning of the label receiver, in particular by storing data from the one or more sensors regarding the movement and/or position and/or attitude of the one or more robot arms.

It is preferred that the label receiver can be guided and/or is guided movably by a robot system, in particular a robot arm, and the carrier receiver is arranged in a fixed position of the device.

It is possible for the method to be executed and/or for the device to have been configured such that the adhesive depositing device and/or the label receiver are moved during the application of the adhesive. The method is preferably carried out and/or the device is configured such that the label receiver is preferably brought into a printing position and/or the adhesive is applied in the first defined shape by means of a relative movement of the adhesive dispensing unit and the label receiver. It is possible for the adhesive dispensing unit and/or the label receiver to be moved in one or more spatial directions, in particular selected from the x direction, the y direction and/or the z direction of a Cartesian coordinate system.

In particular, a movement of the label receiver relative to the glue dispensing unit and/or relative to the curing unit is in addition carried out by means of the means for carrying out the relative movement of the label receiver and the carrier receiver.

It is preferred that the label is held register-accurately in the label receiver and/or the label receiver is designed to hold the label in a register-accurate manner and/or the label and/or the label receiver has for example markings as registration marks, which preferably make a register-accurate holding position recognizable. For the register-accurate holding of the label, the label receiver can have for example a shape adapted to the shape of the label and/or adapted holding elements.

It is possible for the laying of the label and the carrier one on top of the other to be carried out register-accurately, in particular with a tolerance of less than ±1 mm, preferably ±0.5 mm, preferably ±0.2 mm. The tolerance is in particular a deviation of the actual position from a target position.

For this, the device can have one or more sensors for determining the relative position of the label and the label receiver and/or of the label and the carrier. It is also possible for the label receiver and/or the carrier receiver, the label and/or the carrier to have one or more registration marks or for one or more elements of the label and/or of the carrier to be used as registration marks, wherein the position of the registration marks is determined by the one or more sensors and compared with a target value, and an adaptation of the relative position of the label and the carrier is possibly derived therefrom.

The carrier receiver preferably comprises or consists of one or more of the following parts: a rigid surface, on which the carrier is placed, a table, indentation, spacer, clamping devices, screw joint, magnetic holder, vacuum holder. The provision of the carrier can for example be effected by means of a manual placement on the carrier receiver and/or by means of a placement on the carrier receiver preferably by a robot arm. In particular, the carrier, preferably by means of the one or more clamping devices and/or screw joint and/or indentation and/or magnetic holder and/or vacuum holder, is held in a defined position by the carrier receiver and/or the carrier receiver is provided in a defined and fixed position. The carrier receiver is in particular adapted to the geometry of the carrier. The carrier receiver can consist of steel or of plastic. The carrier receiver can be produced in particular by means of 3D printing.

The device preferably comprises a curing unit for at least partially curing and/or at least partially crosslinking the one or more adhesive layers. It is possible that, before the at least partial curing and/or at least partial crosslinking, in particular before a curing and/or complete crosslinking, of the one or more adhesive layers, the label receiver is moved away from the label. It is also possible for the at least partial curing and/or at least partial crosslinking to be effected by means of one or more of the following steps: irradiation, in particular in the visible range, i.e. in particular by means of irradiation with visible light, and/or by means of UV irradiation, preferably by means of UV-A radiation, UV-B radiation and/or UV-C radiation, electron beam curing, curing by heat, anaerobic curing, anionic curing, moisture-initiated crosslinking, multi-component curing, in particular two-component curing. It is thus possible for example for the curing to be carried out by waiting and/or a heat input in the case of self-curing adhesives.

UV radiation is formed in particular of wavelengths in a range of from 100 nm to 400 nm. UV-A radiation is formed in particular of wavelengths in a range of from 315 nm to 400 nm. UV-B radiation is formed in particular of wavelengths in a range of from 280 nm to 315 nm. UV-C radiation is formed in particular of wavelengths in a range of from 100 nm to 280 nm. Visible light is formed in particular of wavelengths in a range of from 400 nm to 780 nm. IR radiation is formed in particular of wavelengths in a range of from 780 nm to 1 mm. Near infrared (NIR) is formed in particular of wavelengths in a range of from 780 nm to 3 μm. Mid infrared (MIR) is formed in particular of wavelengths in a range of from 3 μm to 50 μm. Far infrared is formed in particular of wavelengths in a range of from 50 μm to 1 mm.

It is possible in particular for the curing unit to have or to have been formed by an irradiation unit, in particular for irradiation with visible light and/or with UV radiation, preferably UV-A, UV-B and/or UV-C radiation, for irradiation of the one or more adhesive layers and/or for the at least partial curing and/or at least partial crosslinking to be effected or to be able to be carried out by means of irradiation, in particular UV irradiation, preferably by means of UV-A radiation, UV-B radiation and/or UV-C radiation, and/or by means of visible light.

The irradiation unit has preferably been designed or the irradiation is preferably carried out such that an irradiation is carried out with wavelengths in a range of from 50 nm to 600 nm, preferably from 100 nm to 450 nm, further preferably from 100 nm to 405 nm, and/or an irradiation is carried out with a duration in a range of from 0.25 s to 20 s, preferably 1 s to 5 s, and/or that during the irradiation there is a temperature, in particular of the label, of the carrier and/or of the one or more adhesive layers, in a range of from 10° C. to 100° C., preferably 15° C. to 40° C. The irradiation is carried out for example by means of one or more lamps, in particular UV lamps, preferably UV LEDs, and/or LEDs for radiation in the visible range and/or mercury vapor lamps which have been doped with iron and/or gallium and/or indium and/or bismuth and/or lead and/or tin. The distance of the one or more lamps preferably lies in a range of from 10 mm to 1,000 mm, preferably from 50 mm to 200 mm. The power of the one or more lamps, in particular UV lamps, preferably UV LEDs, and/or LEDs for radiation in the visible range and/or mercury vapor lamps which have been doped with iron and/or gallium and/or indium and/or bismuth and/or lead and/or tin preferably lies in a range of from 10 $mW/cm^2$ to 5,000 $mW/cm^2$, preferably 50 $mW/cm^2$ to 500 $mW/cm^2$.

The irradiation is preferably effected over the whole surface, in particular after the label has been moved away from the label receiver. The one or more adhesive layers are thus to be cured and/or crosslinked in particular almost completely. A complete curing and/or complete crosslinking, thus in particular a crosslinking of 100% of the polymer constituents capable of crosslinking and/or an achievement of the final hardness of the one or more adhesive layers, can then be effected for example within a period of 12 hours.

The following step is preferably carried out in the method: precuring of the one or more adhesive layers over part of the surface or over the whole surface. A fixing of the label at one point or several points of the carrier can be achieved herewith, with the result that when the label receiver is taken off the label the label does not slip or lift off together with the label remover. It is possible for the device to have a precuring unit for precuring the one or more adhesive layers partially or over the whole surface, in particular while the label receiver is in contact with the label. The precuring unit is preferably an irradiation unit, in particular for irradiation with UV radiation, preferably UV-A, UV-B and/or UV-C radiation, and/or with visible light, and/or with IR radiation. The one or more adhesive layers here preferably have been or are not yet completely cured or not yet completely crosslinked at least in areas.

In particular, the label receiver has one or more transparent, preferably UV-transparent, areas and/or one or more holes, and/or the one or more adhesive layer are irradiated or can be irradiated through the one or more transparent areas and/or holes, in particular while the label receiver is still in contact with the label.

It is thus possible for the radiation of the precuring unit preferably to pass through the transparent areas and/or the holes before the radiation strikes the one or more adhesive layers. This makes it possible to increase the adhesion between the label and the carrier before the label is taken off the label receiver. Thus, the label receiver can in particular be taken off the label securely, reliably and in a manner that is gentle on the one or more adhesive layers.

A precuring of the adhesive after the application of the adhesive, in particular directly after the application of the adhesive, and before the laying of the label and the carrier one on top of the other is also conceivable. Undesired flowing of the adhesive can in particular be prevented hereby.

It is also possible for the one or more adhesive layers to be cured and/or completely crosslinked, in particular by means of the curing unit, in particular by means of irradiation, preferably UV irradiation, and/or irradiation with visible light and/or IR irradiation, preferably after the label receiver has been taken off. The device, in particular the curing unit, has preferably been designed such that the one or more adhesive layers are cured and/or completely crosslinked by means of the curing unit after the label receiver has been taken off, in particular by irradiation, preferably UV irradiation and/or irradiation with visible light.

"Not yet completely cured" preferably describes a layer, in particular the protective varnish layer, when its hardness and/or durability does not yet have a fixed minimum value. The fixed minimum value of the hardness and/or of the durability is preferably a function of the ultimate intended use of the layer, for example as a protective varnish layer. "Completely cured" within the meaning of the present invention therefore describes a layer when its hardness and/or durability has a fixed minimum value.

It is possible for the above-named minimum values to have been fixed such that a layer is described as not yet completely cured within the meaning of the present invention when not more than 95% of the polymer constituents of the layer that are capable of crosslinking have a crosslinking. A layer is therefore described as completely cured within the meaning of the present invention when more than 95% of the polymer constituents of the layer that are capable of crosslinking have a crosslinking. A completely cured or completely crosslinked layer is present when a complete (>95%) crosslinking of its polymer constituents has been effected.

It is also possible for the one or more adhesive layers to be only partially irradiated in an irradiation area, for example because the label and/or the carrier outside the irradiation area is opaque, at least in areas, for the radiation used for the irradiation. Here, the crosslinking initiated in the irradiation area is preferably continued outside the irradiation area in the form of a chain reaction, with the result that the one or more adhesive layers cure or can cure over the whole surface and completely. By opaque is preferably meant a transmittance in a range of from 0% to 15%. By semitransparent or partially transparent is preferably meant a transmittance in a range of from 15% to 50%. By transparent is preferably meant a transmittance in a range of from 50% to 100%. In particular if the label and/or the glue is opaque over the whole surface, it is possible for a self-curing and/or reactively curing adhesive advantageously to be used which does not require high-energy radiation such as for example UV radiation for the curing.

It is possible for the precuring unit and the curing unit to be formed by two separate devices or by the same device. In particular, it is thus possible for the precuring and the curing and/or complete crosslinking of the one or more adhesive layers to be carried out by means of a single irradiation unit or by means of separate irradiation units.

The precuring is effected in particular by means of a first irradiation unit, which has preferably been fastened to the label receiver or to the carrier receiver. In addition, it is possible for the curing and/or complete crosslinking to be effected by means of a second irradiation unit, which has been fastened in particular to the label receiver or to the carrier receiver. The first and the second irradiation units have preferably been fastened to the carrier receiver.

The label preferably comprises or is formed by a sensor film. The sensor film preferably forms a sensor function, preferably a touch sensor function. The sensor function, preferably touch sensor function, has been or is provided in particular by means of the electrically conductive functional layer of the label. For this, the electrically conductive functional layer preferably has one or more conductive tracks and/or one or more capacitive elements. It is possible for the sensor film and/or the electrically conductive functional layer, in particular the one or more conductive tracks and/or the one or more capacitive elements, and/or the carrier layer to be transparent and/or to be non-transparent, in particular opaque.

It is possible in particular for the label, preferably in addition to the sensor film, and/or the sensor film, to have been provided with a decoration and/or to have been provided with further films or layers, e.g. to have been provided with at least one optically active diffuser, at least one optically active mask layer, at least one light guide, at least one light-emitting layer, and/or to have been provided with a functional layer containing the one or more electrical and/or electronic and/or optical and/or optoelectronic components and/or with a functional layer containing one or more further electrical and/or electronic and/or optical and/or optoelectronic components and/or with a functional layer containing optical components.

As follows from the preceding statements, but is also conceivable independently thereof, it is possible for the label to have been designed such that it provides a touch function of the component part. Alternatively or additionally, it is possible for the label to have been designed such that it provides a decoration of the component part, in particular that it provides only a decoration of the component part. Alternatively or additionally, it is also possible for the label to have been designed such that it provides an electrical function, because the label forms for example a flexible printed circuit board with LEDs, with conductive tracks, and/or with heating tracks etc. Preferably, the flexible layer structure is provided by the at least one carrier layer and corresponding functions are provided by the further layer and/or the one or more electrical and/or electronic and/or optical and/or optoelectronic components.

The at least one further layer is preferably selected individually or in combination from: at least one electrically conductive functional layer, in particular the electrically conductive functional layer, at least one color layer, at least one electrically insulating functional layer, at least one optical diffuser layer, at least one optical mask layer, at least one light guide layer, at least one light-emitting layer, at least one protective layer, at least one barrier layer, at least one compensation layer, at least one adhesion-promoter layer, at least one adhesive layer, at least one barrier layer, at least one oxide layer, at least one metal layer.

The one or more electrical and/or electronic and/or optical and/or optoelectronic components and/or the one or more further electrical and/or electronic and/or optical and/or optoelectronic components can comprise active components and/or passive components. The one or more electrical and/or electronic and/or optical and/or optoelectronic components and/or the one or more further electrical and/or electronic and/or optical and/or optoelectronic components are preferably selected individually or in combination from: at least one LED; at least one OLED, at least one plug, at least one socket, at least one sensor, at least one electrical resistor, at least one capacitor, at least one controller, at least one processor. The one or more electrical and/or electronic and/or optical and/or optoelectronic components have preferably been electrically contacted by the at least one electrically conductive functional layer, in particular with the result that the electrically conductive functional layer in particular acts as a conductive track.

It is conceivable that the one or more electrical and/or electronic and/or optical and/or optoelectronic components are present in the label, preferably at least on the carrier layer, separately and/or exposed or that the further layer comprises or consists of a functional layer which comprises and/or encapsulates the one or more electrical and/or electronic and/or optical and/or optoelectronic components or parts thereof.

The label preferably has the following layers, in particular in the specified order, preferably starting with a side which forms a visible face of the component part, selected individually or in combination from:

- a first protective layer;
- the further layer, in particular comprising or consisting of: one or more first color layers; one or more first decorative layers;
- the electrically conductive functional layer and/or the one or more electrical and/or electronic and/or optical and/or optoelectronic components or parts thereof;
- the carrier layer;
- a primer.

However, further layers and any desired orders of the layers are also possible. The first protective layer has in particular been designed firmly integrated in the label or detachable from the label. The label preferably has at least the first protective layer and the primer, wherein the carrier layer and the further layer, in particular the electrically conductive functional layer, and/or the one or more electrical and/or electronic and/or optical and/or optoelectronic components, which are preferably comprised by the sensor film, have been arranged between the primer, in particular in any desired order. It is also conceivable that a second protective layer has been arranged on a side of the primer facing the carrier layer. It is also conceivable that a third protective layer has been arranged on a side of the primer facing away from the carrier layer, wherein the third protective layer is detachable and is preferably detached before the adhesive is applied.

It is possible for the carrier layer of the label to have or to consist of one or more of the following materials: PET (polyethylene terephthalate), PC (polycarbonate), PMMA (polymethyl methacrylate), ABS (acrylonitrile butadiene styrene), PC-ABS, PP (polypropylene), PA (polyamide), PE (polyethylene). In particular, the label has a thickness in a range of from 25 μm to 350 μm, preferably in a range of from 50 μm to 150 μm. It is also possible for the label to have a surface area, in particular in a top view and/or when viewed perpendicular to a plane spanned by the label and/or disregarding the thickness of the label, in a range of from 1 $cm^2$ to 2,000 $cm^2$, in particular in a range of from 1 $cm^2$ to 1,000 $cm^2$. In particular, it is possible for example for the label not to have a purely rectangular or purely circular contour. It is also possible for the label to have a surface area, in particular when viewed perpendicular to a plane spanned by the label and/or disregarding the thickness of the label, which comprises a contour of a part or a whole of one or more of the following shapes at least in areas: circle, ellipse, triangle, rectangle, alphanumeric character, fractal shape. The contour can also have been formed by openings at least in areas.

It is possible for the carrier to be transparent, opaque, partially transparent and/or non-transparent in areas or over the whole surface. In particular, the carrier can have one or more transparent windows, for example for a display, and/or one or more patterned transparent areas, for example symbol-shaped areas, in particular for buttons. It is therefore advantageous if the adhesive and/or the one or more adhesive layers expediently do not influence the transparency.

The carrier preferably has a maximum wall thickness in a range of from 0.1 mm to 10 mm, in particular in a range of from 0.1 mm to 5 mm, preferably in a range of from 1 mm to 5 mm, preferably in a range of from 1.5 mm to 3.5 mm, or in a range of from 0.15 mm to 10 mm, preferably in a range of from 0.2 mm to 10 mm. It is possible for the carrier to have such a maximum wall thickness only in subareas or in all areas. In particular in the case of small wall thicknesses, the advantage of a low thermal load carries particular weight.

In a preferred embodiment example, the carrier does not have a frame. However, it can have a frame with a height of at most 100 mm, preferably of at most 50 mm, particularly preferably of at most 20 mm. Here, in particular despite a comparatively poor handling, a rapid, safe and reproducible processing is guaranteed because of the automated method or the automated device.

It is possible for the carrier to have been decorated on the front and/or on the back, in particular before the application of the label. It is also possible for the component part to be decorated on the front and/or on the back after the application of the label to the carrier.

It is possible for the label to have a contacting tail for contacting, in particular electrically contacting, the further layer, in particular the electrically conductive functional layer, and/or the one or more electrical and/or electronic and/or optical and/or optoelectronic components. In the method the contacting tail preferably is and/or remains free of adhesive and/or free of material of the carrier, preferably free of adhesive and/or free of material of the carrier at least in a contact area. For this, in particular the one or more defined shapes of the adhesive are applied with an adapted shape and amount, for example to form beads in a bone structure, and in particular the contact area is left free of adhesive. Furthermore, the relative movement of the label and the carrier preferably has been or is adapted, in particular by means of a lifting movement and/or a seesawing movement, preferably with the result that the contact area remains free of adhesive and/or free of material of the carrier.

A defined pressure and/or a defined relative movement can in particular also be exerted on the label, the adhesive and the carrier. Furthermore, a defined temperature range of the label, the adhesive and the carrier can have been or be set during the laying of the label and the carrier one on top of the other. Thus, a squeezing of the glue out at the sides of the label, which would impair the contacting tail, can advantageously be avoided.

The contacting tail is held on the label receiver preferably in a defined position. For this, the label receiver can have for example means for suctioning the tail by means of vacuum, one or more clamping devices and/or one or more spacers. The contacting tail preferably has a smaller surface area than the rest of the label, in particular when viewed perpendicular to a plane spanned by the label.

It is possible for one or more of the following steps to be carried out, in particular after the label and the carrier have been laid one on top of the other, preferably after the complete curing and/or complete crosslinking of the one or more adhesive layers:

- removing the component part from the carrier receiver,
- peeling off a first protective layer of the label.

It is possible for one or more of the following steps to be carried out, in particular before the application of the adhesive and/or before the laying of the label and the carrier one on top of the other:

- pretreating the label and/or the carrier, in particular by cleaning, blowing with ionized air, cleaning with chemicals, e.g. with alcohol, plasma treatment and/or corona treatment of a surface of the label and/or a surface of the carrier, peeling off a second protective layer of the label.

The device preferably has a pretreatment unit for pretreating the label and/or the carrier, for example by blowing ionized air against the carrier and/or by a plasma treatment and/or by a corona treatment and/or by a cleaning with chemicals, e.g. with alcohol. The pretreatment unit is or comprises for example individually or in combination: an ionizer and means for blowing ionized air against the carrier, a device for plasma treatment, a device for corona treatment, a device for cleaning with chemicals, e.g. with alcohol.

In particular, at least the surface of the label and/or of the carrier is pretreated by the pretreatment, and it is then brought into contact with the one or more adhesive layers. The pretreatment is thus preferably a cleaning or an activating of the corresponding surface. Thus, e.g. an improved wetting by the adhesive and/or improved flow properties of the adhesive in the process and/or an improved adhesive force in the process and/or in the final product can be achieved.

The label receiver is preferably detached and/or moved away from the label before the complete curing and/or complete crosslinking. Before the label receiver is moved away and/or detached from the label, the precuring of the adhesive or of the one or more adhesive layers is preferably carried out.

It is possible for one or more nuisance particles enclosed bubble-free to be present in the one or more adhesive layers and/or for a surface of the carrier which is provided with one or more adhesive layers bubble-free and which has unevennesses, steps, indentations and/or elevations to be present. It is also possible for the carrier to have a curved surface and/or elevations and/or indentations on a surface facing the label, in particular wherein the one or more adhesive layers have a variation in layer thickness following the curved surface and/or the elevations and/or the indentations. Furthermore, the carrier can have one or more elevations and/or indentations, in particular additional elevations and/or indentations, which are present in particular in the form of at least one frame and/or one or more catches. "Additional elevations and/or indentations" means here in particular that these are present in addition to the surface of the carrier provided with the one or more adhesive layers. In particular, the carrier thus has a three-dimensional shape. Despite correspondingly complex geometries of such carriers, they can still be reliably provided with a label in particular using the method according to the invention.

BRIEF DESCRIPTION OF THE DRAWINGS

In the following, the invention is explained by way of example with reference to several embodiment examples with the aid of the accompanying drawings. There are shown in.

DETAILED DESCRIPTION

Figure 1A:
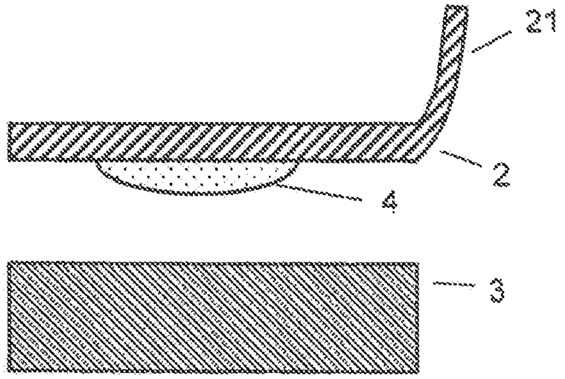
FIGS. 1*a* to 1*c* schematic cross sections of a component part and its components, FIGS. 2*a* to 2*c* schematic drawings of component parts, FIGS. 3*a* to 3*i* method and device for producing the component part, FIGS. 4*a* and 4*b* schematic cross sections of a component part and its components, FIG. 5, schematically, a method for producing a component part, FIG. 6, schematically, a top view of a label with adhesive, FIGS. 7*a* to 7*c*, schematically, a top view of a label and cross sections thereof, FIGS. 8*a* to 8*g* schematic cross sections of labels.
Figure 1B:
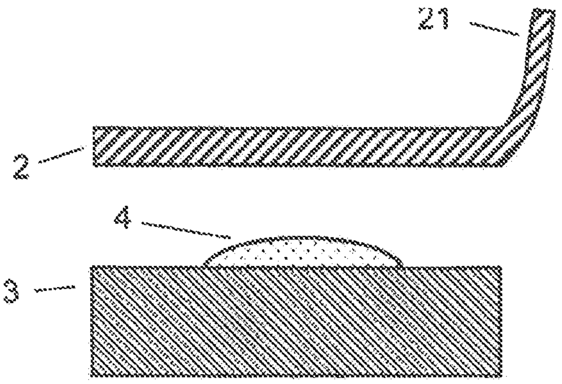
Figure 1C:
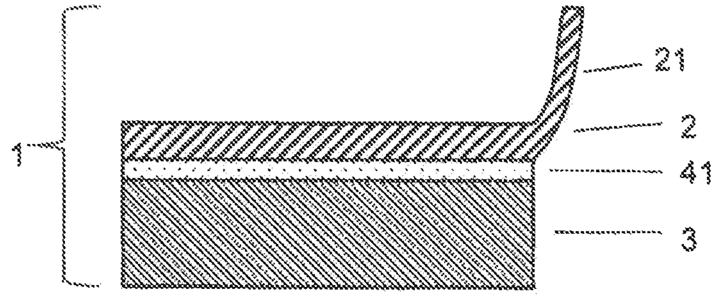

FIG. 1*a* and FIG. 1*b* show schematic cross sections of the components of an example component part 1 before the laying of the label 2 and the faceplate 3 one on top of the other with reference to schematic cross sections through the label 3, the adhesive 4 and through the carrier 3. FIG. 1*c* shows, schematically, a cross section through an example component part 1 with the label 2, the adhesive layer 41 and the carrier 3. As is illustrated by way of example by FIGS. 1*a* to 1*c*, it is possible for the glue to be displaced from the one or more first defined shapes, for example the shape shown in FIG. 1*a* or FIG. 1*b*, to one or more second defined shapes, such as the shape of the adhesive layer 41, by the laying of the label 2 and the carrier 3 one on top of the other, with the result that the one or more adhesive layers, in particular the adhesive layer 41, results therefrom. Through the flowing of the adhesive 4 during this process, in particular, elevations and indentations, preferably with small radii of curvature, can be filled with adhesive 4 and/or nuisance particles can be enclosed, preferably without bubble formation. This is illustrated by way of example in FIG. 4*b* and described in more detail in relation thereto. It is advantageously possible to carry out an automated method and/or to use a device for carrying out the automated method. In particular, at least the laying of the label 2 and the carrier 3 one on top of the other can be carried out in an automated manner or is carried out in an automated manner.

Figure 2A:
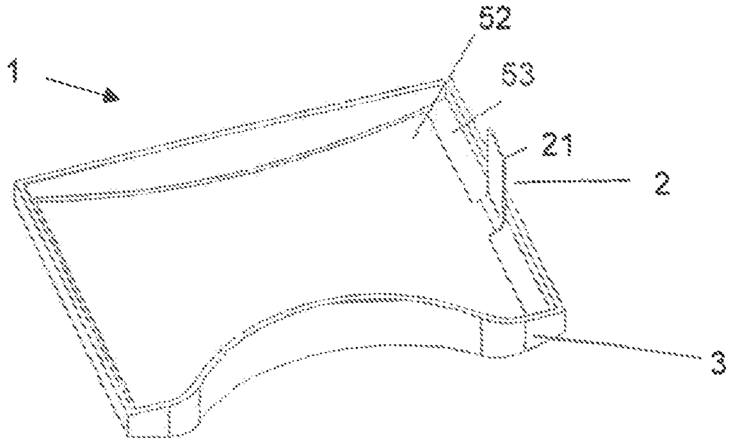
Figure 2B:
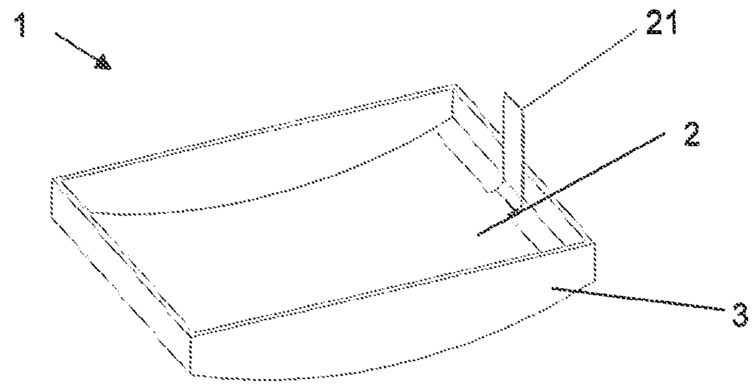
Figure 2C:
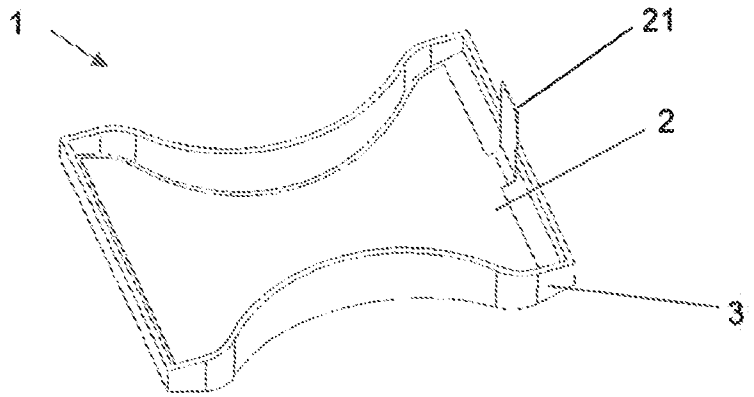

FIGS. 2*a* to 2*c* show example component parts 1. As is shown there, it is possible for the carrier 3 to have a complex geometry. The carrier 3 has for example a cylindrical curvature, in particular a so-called 2.5D shape. In particular, it is possible for the carrier 3 additionally to have a frame. It is thus possible in particular for the carrier 3 to have a 3D shape with a 2.5D surface area to be coated with the label 2. However, it is also conceivable that the carrier 3 has been designed smooth and flat, for example in the form of a glass substrate. It is possible for the carrier 3 to have been or to be produced by plastic injection molding. In addition, it is possible for the carrier 3 to be transparent, opaque, partially transparent and/or non-transparent in areas or over the whole surface. In particular, the carrier 3 can have one or more transparent windows, for example for a display, and/or one or more patterned transparent areas, for example symbol-shaped areas, in particular for buttons. It is therefore advantageous if the adhesive and/or the one or more adhesive layers expediently do not influence the transparency.

The carrier 3 preferably has a maximum wall thickness in a range of from 0.15 mm to 10 mm, in particular from 1 mm to 5 mm. It is possible for the carrier 3 to have such a maximum wall thickness only in subareas or in all areas. In particular in the case of small wall thicknesses, the advantage of a low thermal and mechanical load carries particular weight.

In a preferred embodiment example, the carrier 3 has a frame or other elevations (e.g. fastening elements) with a height of at most 100 mm, preferably of at most 50 mm, particularly preferably of at most 20 mm. Here, in particular despite a comparatively poor handling, a rapid, safe and reproducible processing is guaranteed because of an advantageously automated method or an advantageously automated device.

It is also possible for the carrier 3 to have been decorated on the front and/or on the back. It is also possible for the component part 1 to be decorated on the front and/or on the back after the application of the label 2 to the carrier 3.

As is moreover illustrated by FIGS. 2*a* to 2*c*, it is possible for the optional contacting tail 21 to be free of adhesive 4 and material of the carrier 3. With the contacting tail 21, for example, a coupling to an electronic component part can thus be effected or the component part 1 can be integrated in an electronic component part.

The carrier 3 preferably has at least one curved surface, which lies for example in the curvature area 53 in FIG. 2*a*. In this example, the curvature area 53 is delimited by the frame of the component part 1 or of the carrier 3. In the area of the curvature area 53, the label 2 has been applied, which likewise has a curved surface, which is present in the curvature area 52 of the label. The curvature area 52 of the label can cover the entire label 2 or, as is to be seen e.g. in FIG. 2*a*, only a subarea of the label 2. The curved surface of the carrier 3 is for example already present when the carrier 3 is provided. The curved surface of the label 2 is preferably first formed by the receiving of the label 2 with the label receiver 20, as is illustrated for example by FIGS. 3*a* and 3*b*.

As is illustrated in particular by FIG. 2*a* and FIG. 2*c*, it is possible for example for the label 2 and/or the carrier 3 not to have a purely rectangular or purely circular contour. It is also possible for the label 2 and/or the carrier 3 to have a surface area, in particular when viewed perpendicular to a plane spanned by the label 2 and/or the carrier 3 and/or disregarding the thickness of the label 2 and/or of the carrier 3, which comprises a contour of a part or whole of one or more of the following shapes at least in areas: circle, ellipse, triangle, rectangle, alphanumeric character, fractal shape. In a top view of the label 2 shown by way of example by FIG. 2*a*, for example a contour consisting of a part of a rectangle and a part of a circle or an ellipse would be able to be seen. It is not illustrated by FIGS. 2*a* to 2*c* but also possible that the carrier 3 additionally has elevations and/or indentations and/or openings and the label 2 has been or is adapted to such a carrier 3 for example by deformations, which are in particular brought about by the label receiver 20, or by openings present in the label. The contour of the label 2 and/or the carrier 3 can thus also have been formed by openings at least in areas. It is also possible for one or more elevations and/or indentations which are present in the carrier 3 to be filled by the adhesive 4, wherein the label 2 has for example a curved surface which has been or is adapted to an entirety of curvature, indentations and/or elevations of the carrier 3, as is to be seen for example in FIG. 4*b*.

FIGS. 3*a* to 3*i* show, schematically, the steps of an example method for producing the component part 1 by means of a device. The device has a label receiver 20, a carrier receiver 30 and an adhesive dispensing unit 40. In the example method, the following steps are carried out, preferably in the specified order.

Figure 3A:
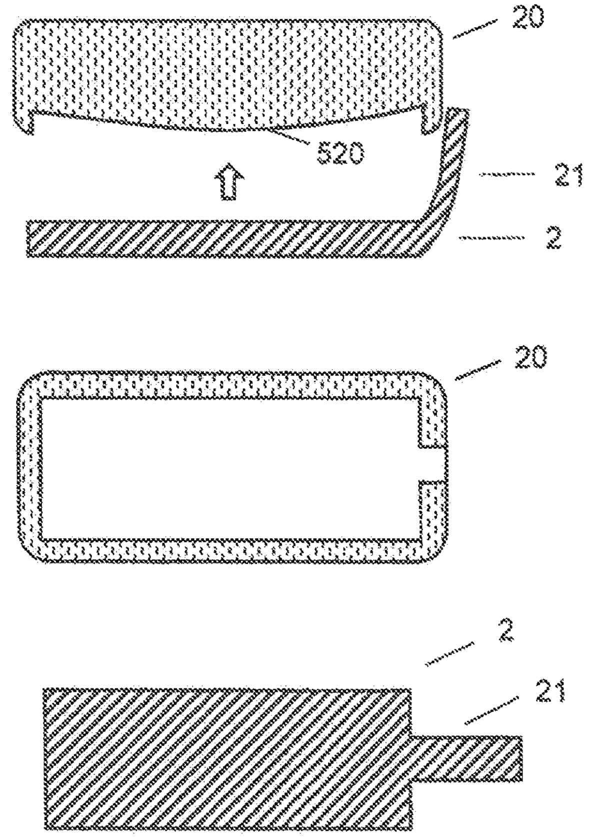
Figure 3B:
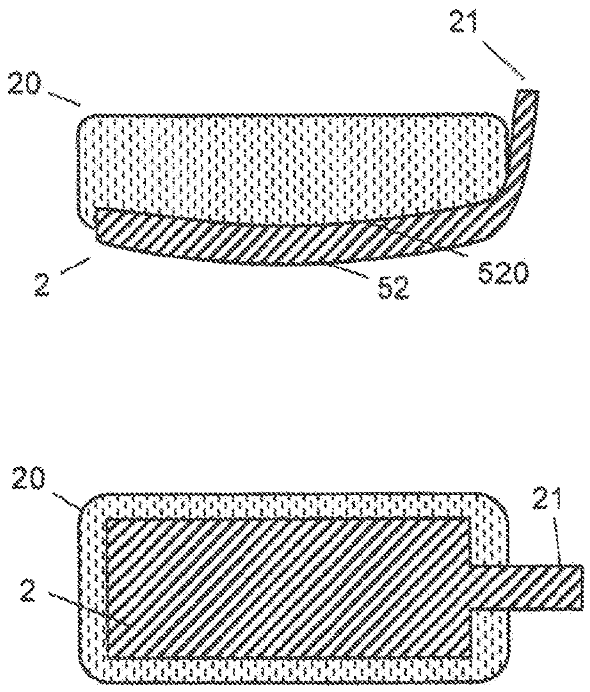

The steps a1) and a2) as well as b1 and b2) described below are illustrated by way of example by FIG. 3*a* and FIG. 3*b* as well as FIG. 3*c*. In the lower two images FIG. 3*a* shows a top view of the label receiver 20 and a top view of the label 2. In the lower image FIG. 3*b* shows a top view of the label receiver with the label 2.

Step a1) Providing a label 2. The label 2 has a flexible layer structure. The label 2 comprises at least one carrier layer, such as the carrier layer 23, and in addition comprises a further layer, such as for example the electrically conductive functional layer 22, wherein the carrier layer 23 and the functional layer 22 are illustrated for example with reference to one of FIGS. 4*a*, 4*b*, 8*a* to 8*g*. As an alternative to the further layer, in particular to the functional layer 22, or in addition thereto, it is possible for the label 2 to have one or more electrical and/or electronic and/or optical and/or optoelectronic components, such as are illustrated by way of example with reference to the components 261 of FIG. 8*c* or 8*g*. The label can furthermore have been constructed in particular as is described in more detail for example in relation to FIGS. 7*a* to 7*c* and FIGS. 8*a* to 8*g*. Optionally, the label 2 has a contacting tail 21. Possible designs of the contacting tail are is described in more detail for example in relation to FIGS. 7*a* to 7*c*.

Step a2) Receiving the label 2 with the label receiver 20.

The label 2 shown in FIG. 3*a* can be provided for example manually and/or by means of a robot arm, in particular in or from a magazine. After the provision, a vacuum is for example generated by the label receiver 20, in particular by means for generating a vacuum which are exhibited by the label receiver 20, with the result that the label 2 is suctioned by the label receiver 20. As is illustrated by FIGS. 3*a* and 3*b*, it is possible for the label receiver 20 to have a fitted shape adapted to the shape of the label 2. During the receiving of the label 2 it is preferably possible for the label 2 to be curved and to adopt a shape following the contour of the label receiver 20. For this, a vacuum, which suctions the label 2, can for example be generated by means of the label receiver 20. In this example the label receiver 20 has the curvature area 520, which comprises a curved surface. Because the label 2 is received, in particular is suctioned, in this area 520, the label 2 is deformed and the curvature area 52 of the label 2 is formed with a corresponding curved surface. The curved surface of the label 2 in the curvature area 52 has been adapted in particular depending on a curved surface of the carrier 3, such as is present for example in the curvature area 53 of the carrier. By way of example, such curvature areas are also described FIG. 2*a* to FIG. 2*c*. Thus, through a defined relative movement, such as is described in more detail by way of example in relation to FIG. 3*f*, the adhesive 4 provided between the label 2 and the carrier 3 can be displaced in a controlled manner and the one or more adhesive layers, in particular the adhesive layer 41, can be formed.

It is also possible for the label receiver 20, as an alternative or in addition to the means for generating a vacuum, to have for example a mechanical holder and/or a clamp for receiving the label 2.

The label receiver 20 is preferably connected to a robot system, which makes it possible to move the label receiver 20 to different positions for carrying out the respective steps. With respect to the robot system, reference is made in particular to the above statements.

The provision of the label 2 is effected before the label 2 is received with the label receiver 20. The provision of the carrier 3 is effected before the carrier 3 is received with the carrier receiver 30, wherein it is possible for the receiving of the label 2 to be carried out first or for the receiving of the carrier 3 to be carried out first or for both to be carried out simultaneously.

Figure 3C:
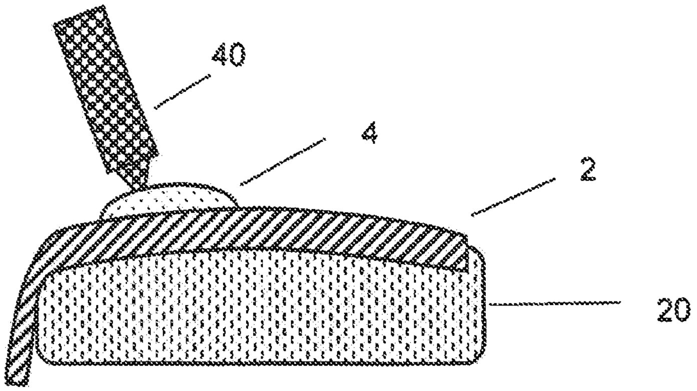

FIG. 3*c* illustrates an example of the step c) described below.

Step c) Applying, by means of the adhesive dispensing unit 40, a flowable adhesive 4, in one or more first defined shapes, to the label 2 held by means of the label receiver 20. Example defined shapes of the adhesive 4 are described in relation to FIG. 6. It is alternatively or additionally possible to apply the adhesive 4 to the carrier 3 held by means of the carrier receiver 30. It is thus also conceivable that the one or more first defined shapes of the adhesive 4 are composed of one or more partial shapes on the label 2 and one or more partial shapes on the carrier 3. As is illustrated by FIG. 3*c*, it is preferably possible for the adhesive dispensing unit 40 to have at least one nozzle and/or at least one dispenser for applying the adhesive 4. The label receiver 20 is preferably guided to the adhesive dispensing unit 40 in particular by means of a robot system. In particular, to apply the adhesive 4, the label receiver 20 is then moved corresponding to a shape to be applied, preferably the one or more first defined shapes, of the adhesive 4 while the adhesive dispensing unit 40 dispenses the adhesive 4 onto the label 2 and is preferably held motionless in the process. It is also conceivable that the adhesive dispensing unit 40 is moved corresponding to a shape to be applied, preferably the one or more first defined shapes, of the adhesive 4 while the adhesive dispensing unit 40 dispenses the adhesive 4 onto the label 2 and the label receiver 20 is preferably held motionless in the process.

Figure 3D:
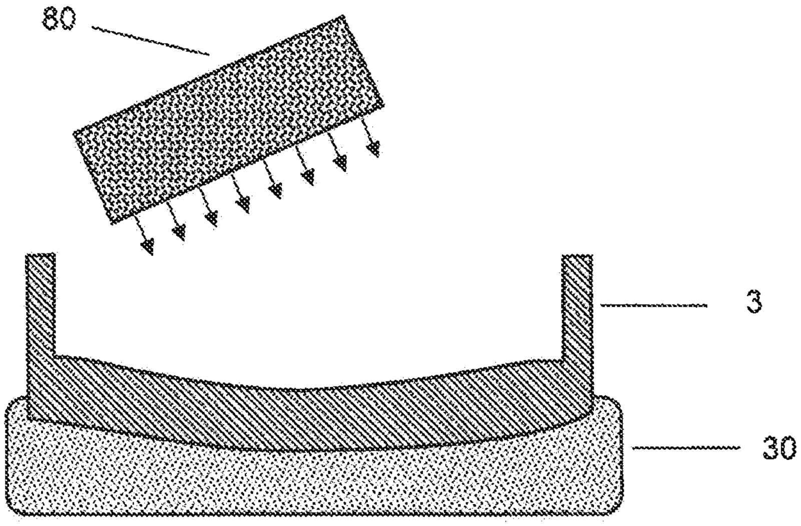

FIG. 3*d*) shows the carrier 3 received on the carrier receiver 30 with an optional pretreatment unit 80. By way of example, the following examples of steps b1) and b2) are illustrated hereby.

Step b1) Providing a carrier 3. The carrier 3 has been constructed for example as is described in more detail in relation to one of FIGS. 2*a* to 2*c*, 7*a* to 7*c* and 8*a* to 8*g*. The provision of the carrier 3 is effected for example by means of a manual placement on the carrier receiver 30 and/or by means of a placement on the carrier receiver 30 by a robot arm.

Step b2) Receiving the carrier 3 by means of the carrier receiver 30.

FIG. 3*d* additionally illustrates an optional step x1), which is preferably carried out before step d).

Step x1) Pretreating the carrier 3 by means of a pretreatment unit 80, for example by blowing ionized air against the carrier 3 and/or by a plasma treatment and/or a corona treatment and/or by a chemical cleaning, e.g. with alcohol. The pretreatment unit 80 is or comprises for example individually or in combination: an ionizer and means for blowing ionized air against the carrier 3, a device for plasma treatment, a device for corona treatment, a device for cleaning with chemicals, e.g. with alcohol.

Figure 3E:
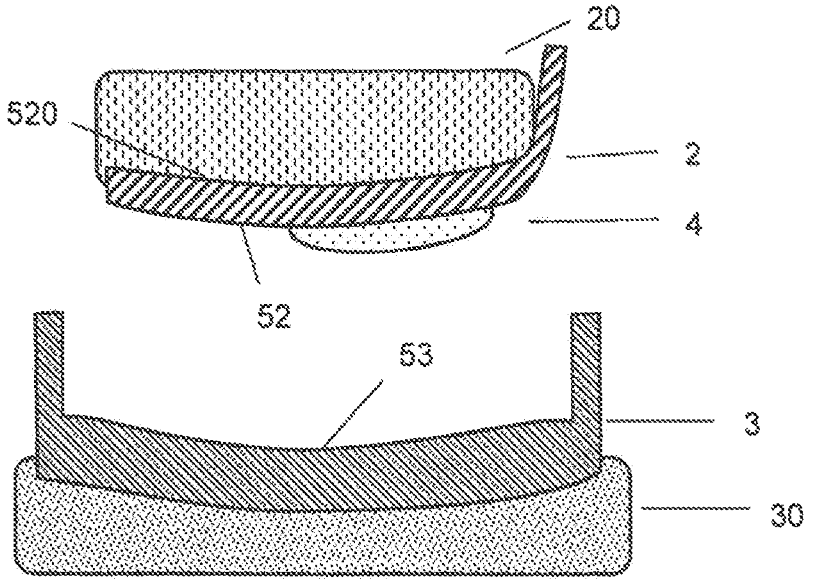
Figure 3F:
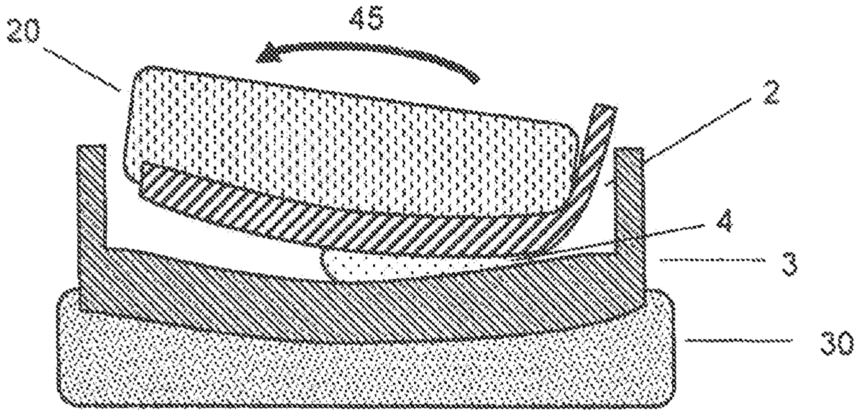

FIG. 3*e* and FIG. 3*f* show an example of the step d) described below.

Step d) Laying the label 2 and the carrier 3 one on top of the other by means of a defined relative movement of the label receiver 20 and the carrier receiver 30, such that the adhesive 4 is arranged between the label 2 and the carrier 3 and one or more adhesive layers, in particular the adhesive layer 41, preferably in one or more second defined shapes, are obtained between the label 2 and the carrier 3. Here, in particular in the case of complex geometries of the carrier 3, the one or more first defined shapes of the adhesive 4 and the relative movement of the label 2 and the carrier 3 can be matched to each other in a targeted manner, with the result that the one or more adhesive layers, in particular the adhesive view 41, results from this. The relative movement preferably comprises a rotational movement in the example shown by FIG. 3*f*. In particular, the relative movement is an optional seesawing movement. The movement is indicated by the arrow 45. This relative movement advantageously makes a targeted and/or defined displacement of the flowable adhesive 4 possible. Specific optional embodiments of the one or more defined first shapes of the adhesive and the relative movement are described in particular in relation to FIG. 6. The laying of the label 2 and the carrier 3 one on top of the other is preferably effected such that the one or more adhesive layers, in particular the adhesive layer 41, have been or are arranged with a minimum thickness of 5 μm between the label 2 and the carrier 3.

Figure 4A:
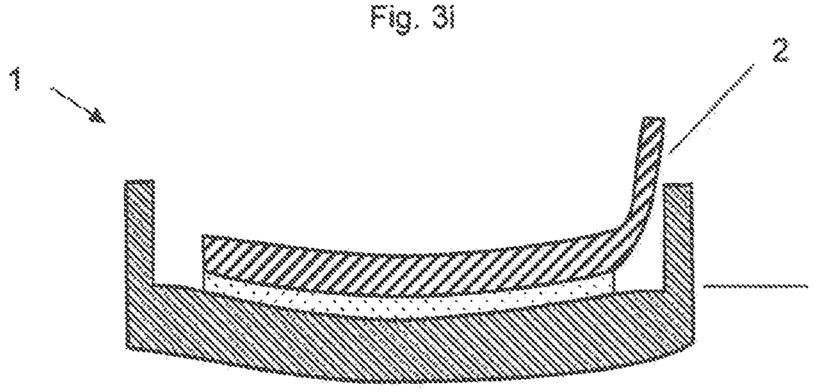
Figure 4B:
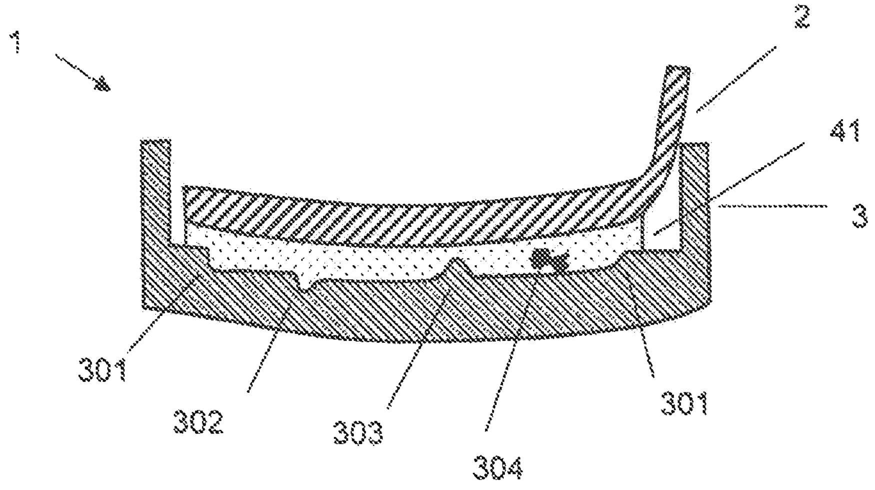

As is illustrated by way of example with reference to a comparison of FIGS. 3*e* and 3*f* with FIGS. 4*a* and 4*b*, it is possible for the one or more first defined shapes to be formed by one or more first layers of the adhesive 4, wherein these one or more first layers of the adhesive are applied over part of the surface, and during the laying of the label 2 and the carrier 3 one on top of the other a displacement of the adhesive 4 results in a greater surface coverage and/or a surface coverage over the whole surface. Through the displacement of the adhesive 4, one or more adhesive layers, in particular the adhesive layer 41, distributed bubble-free and uniformly are thus advantageously obtained.

The label receiver 20 is preferably guided to the carrier receiver 30 in particular by means of a robot system, in particular as a part of the defined relative movement of the label 2 and/or the carrier 3, or the defined relative movement is carried out and/or continued thereafter.

Figure 3G:
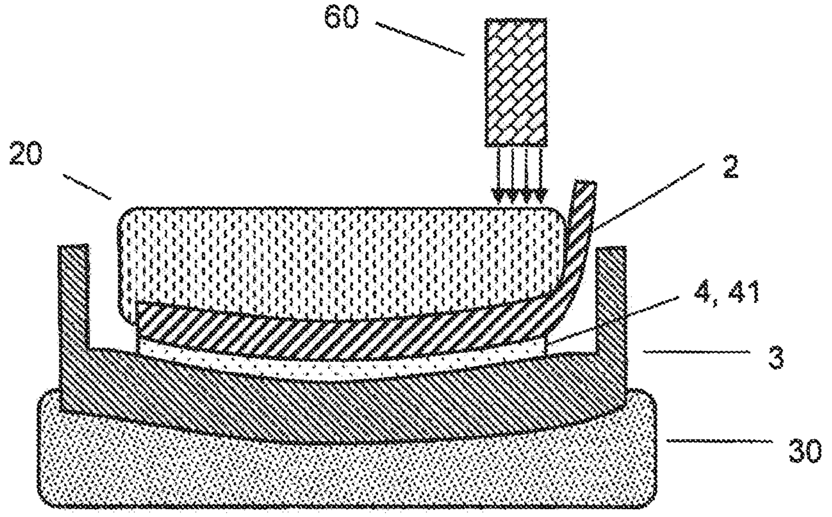

FIG. 3*g* shows an example of an optional step x2) described below.

Step x2) Precuring the one or more adhesive layers over part of the surface.

It is possible for the device to have a precuring unit 60 as shown by way of example in FIG. 3*g* for partially precuring the one or more adhesive layers, in particular while the label receiver 20 is in contact with the label 2. The precuring unit 60 is preferably an irradiation unit, in particular for irradiation with UV radiation, preferably UV-A, UV-B and/or UV-C radiation, and/or with visible light and/or by means of IR radiation. In particular, a UV emitter with a focused irradiation is preferred for the example illustrated by FIG. 3*g*. It is also conceivable that the precuring is carried out over the whole surface, because the label receiver 20 has been formed completely transparent for the corresponding irradiation. In particular, the label receiver has at least one or more transparent, preferably UV-transparent, areas and/or one or more holes, and/or the one or more adhesive layers, in particular the adhesive layer 41, are irradiated or can be irradiated through the one or more transparent areas and/or holes, in particular while the label receiver 20 is still in contact with the label 2. It is thus possible for the radiation of the precuring unit 60 thus preferably to pass through the transparent areas and/or the holes before the radiation strikes the one or more adhesive layers, in particular the adhesive layer 41. This makes it possible to increase the adhesion between the label 2 and the carrier 3 before the label 2 is taken off the label receiver 20. Thus, the label receiver 20 can in particular be taken off the label 2 safely, reliably and in a manner that is gentle on the one or more adhesive layers. The one or more adhesive layers, in particular the adhesive layer 41, preferably have been or are not yet completely cured or not yet completely crosslinked by the precuring at least in areas. A sufficient fixing for safely taking off the label receiver 20 can advantageously already be achieved hereby.

Figure 3H:
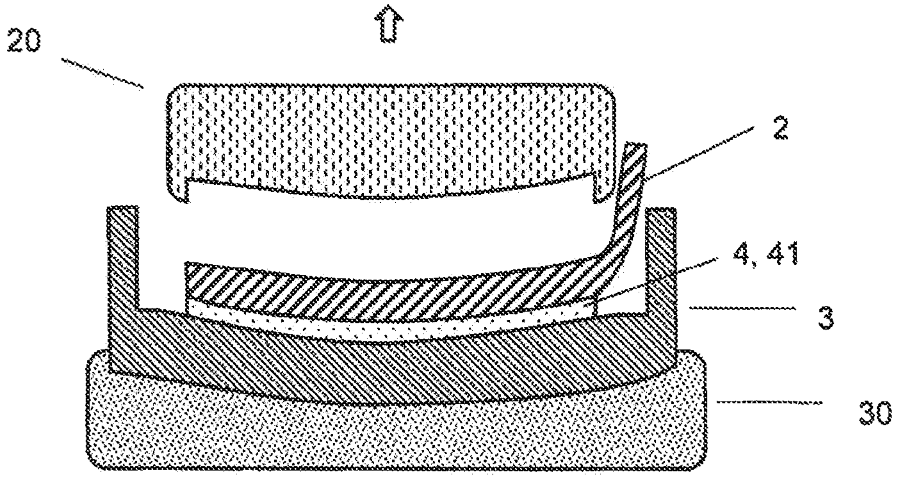

FIG. 3*h* shows an example of an optional step x3) described below.

Step x3) Detaching the label 2 from the label receiver 20.

For this, the label receiver 20 is moved away from the label 2. It is possible for example for the vacuum to be ceased and/or a pressure to be increased on the label receiver 2.

Figure 3I:
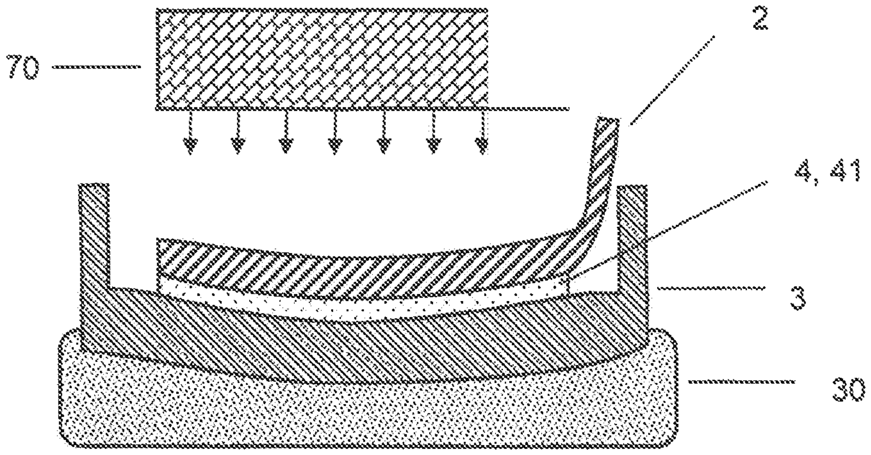

FIG. 3*i*) shows by way of example the step e) described below.

Step e) At least partially curing and/or at least partially crosslinking the one or more adhesive layers, in particular the adhesive layer 41.

It is possible here for the curing to be carried out by means of irradiation, preferably UV radiation, preferably UV-A and/or UV-B and/or UV-C radiation, and/or with visible light and/or IR radiation, as is illustrated in particular by FIG. 3*i*). However, it is also conceivable that the adhesive 4 or the one or more adhesive layers formed therefrom, in particular the adhesive layer 4, are self-curing, preferably with the result that the step of curing and/or crosslinking can be carried out for example by waiting and/or starts up spontaneously, preferably as soon as the adhesive 4 has been applied.

After the curing, the component part 1 produced can be removed from the device.

The device according to the invention for producing the component part 1 preferably serves and/or has been configured to carry out the method. As is shown for example by FIGS. 3*a*) to 3*i*) and described in relation thereto, the device comprises: the label receiver 20 for receiving the label 2. The label 2 has a flexible layer structure. The label comprises at least one carrier layer, such as for example the carrier layer 23 and a further layer, such as for example the electrically conductive functional layer 22. As an alternative to the further layer, in particular to the functional layer 22, or in addition thereto, it is possible for the label 2 to have one or more electrical and/or electronic and/or optical and/or optoelectronic components, such as by way of example the components 261. Optionally, the label 2 has a contacting tail 21. The label 2 can furthermore have been constructed in particular as is described in more detail for example in relation to FIGS. 7*a* to 7*c* and FIGS. 8*a* to 8*g*. In addition, the device comprises the carrier receiver 30 for receiving the carrier 3 and an adhesive dispensing unit 40 for applying the flowable adhesive 4 to the label 2 in one or more first defined shapes by means of the adhesive dispensing unit 40. It is alternatively or additionally also possible for the flowable glue 4 to be able to be applied to the carrier 3 in one or more first defined shapes by means of the adhesive dispensing unit 40. The device has been configured such that a laying of the label 2 and the carrier 3 one on top of the other can be carried out by means of a defined relative movement of the label receiver 20 and the carrier receiver 30. Through this relative movement, an arrangement of the adhesive 4 between the label 2 and the carrier 3 is possible such that one or more adhesive layers, preferably the adhesive layer 41, in particular in one or more second defined shapes, can be obtained between the label 2 and the carrier 3.

It is also possible for the device to have an optional curing unit 70 for at least partially curing the one or more adhesive layers, preferably the adhesive layer 41.

FIGS. 4*a* and 4*b* show schematic examples of a cross section of a produced component part 1.

FIG. 4*a* shows for example a schematic cross section through a component part 1 as described in relation to FIGS. 2*a* to 2*c*. The label 2 has for example a curved surface complementary to the carrier 3. A component part 1 as illustrated by way of example by means of FIG. 4*b* has, in particular, indentations and/or elevations in addition to at least one curved surface. It is thus also possible for one or more elevations and/or indentations which are present in the carrier 3 to be filled by the adhesive 4, wherein the label 2 has for example a curved surface which has been or is adapted to an entirety of curvature, indentations and/or elevations of the carrier 3. Here, in particular, a variation in layer thickness of the one or more adhesive layers, in particular the adhesive layer 41, which preferably results from the displacement during the relative movement of the label 2 and the carrier 3, has been or is formed.

As is shown by FIG. 4*a* and FIG. 4*b* by way of example, a component part 1 is thus possible which has been or is preferably produced by means of the method according to the invention and/or by means of the device according to the invention. The component part 1 comprises a label 2. The label 2 comprises at least one carrier layer, such as the carrier layer 23, and a further layer, such as the electrically conductive functional layer 22. As an alternative or in addition to the further layer, the label 2 comprises one or more electrical and/or electronic and/or optical and/or optoelectronic components, such as the components 261. Furthermore, the component part 1 comprises a carrier 3 as well as one or more adhesive layers, such as the adhesive layer 41, which are arranged between the label 2 and the carrier 3. The one or more adhesive layers, such as the adhesive layer 41, have been applied as a flowable adhesive 4, then displaced by a defined relative movement of the label 2 and the carrier 3 and subsequently cured and crosslinked. The carrier 3 here has an in particular complex shape, because the surface to be coated has for example steps 301, an indentation 302 as well as an elevation 303. In particular through the arrangement between the label 2 and the carrier 3 and the application of the glue 4 in a flowable form with the subsequent displacement, the one or more adhesive layers are thus distributed on the coated surface of the carrier 3 such that the elevations 303 and indentations 301 as well as the radii on the steps 301 are completely filled, which is achieved in particular by a variation in layer thickness of the adhesive layer 41, which preferably results because of the flowability of the adhesive 4 during the laying of the label 2 and the carrier 3 one on top of the other. In addition, a nuisance particle 304 is arranged between the label 2 and the carrier 3. This nuisance particle 304 is advantageously enclosed, without bubble formation, by the adhesive 4 or the one or more adhesive layers obtained therefrom, in particular the adhesive layer 41. As is illustrated hereby, it is thus possible for one or more nuisance particles enclosed bubble-free to be present in the one or more adhesive layers and/or for a surface of the carrier which is provided bubble-free with one or more adhesive layers and which has unevennesses, steps, indentations and/or elevations to be present. The adhesive layer 41 preferably has a thickness which is at least 30% greater than the height or depth of the structure to be compensated for in each case (here by way of example: step 301, indentation 302, elevation 303, nuisance particle 304).

Figure 5:
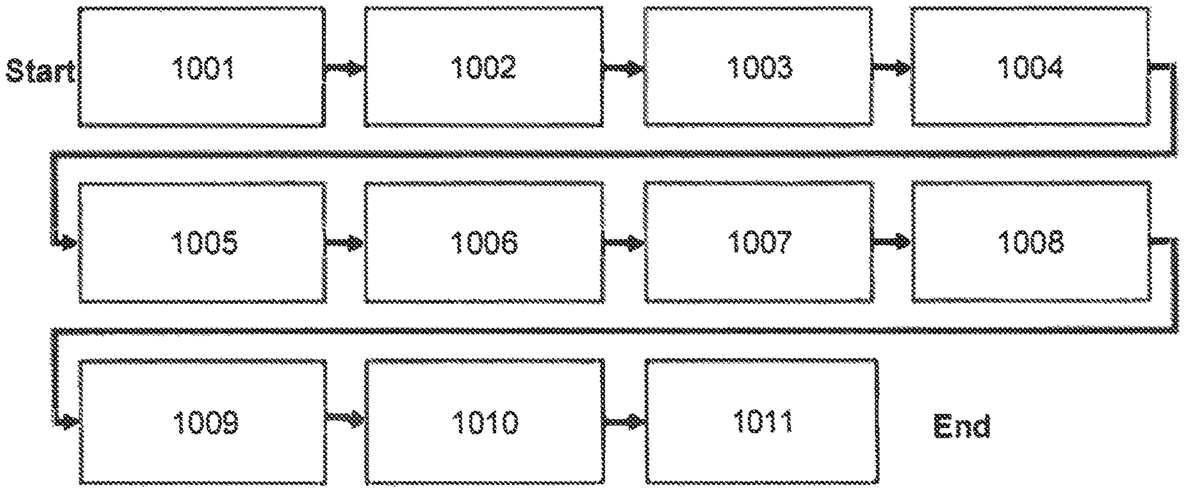

FIG. 5 shows an example of a method with the steps, in particular in the specified order:

Step 1001: Providing the label 2, which has a flexible layer structure and preferably is or comprises a sensor film, manually and/or by means of a robot arm, in particular in or from a magazine, and the carrier 3 by means of a manual placement on the carrier receiver and/or by means of a placement on the carrier receiver by a robot arm.

Step 1002: Optionally pretreating the carrier, for example by means of treatment with ionized air, corona treatment and/or plasma treatment and/or cleaning with chemicals, e.g. with alcohol.

Step 1003: Receiving the label 2 by means of the label receiver 20, in particular by suction by means of a vacuum, Step 1004: Applying the flowable adhesive 4 to the label 2

Step 1005: Laying the label 2 on top of the carrier 3, in particular by means of a movement of the label receiver 20.

Step 1006: Optionally precuring the adhesive 4 or the one or more adhesive layers obtained therefrom, in particular the adhesive layer 41, preferably wherein the precuring takes place only in a subarea and/or takes place by means of irradiation through the label receiver 20 and/or one or more holes of the label receiver 20.

Step 1007: Moving the label receiver 20 away from the label 2, in particular through a movement of the label receiver 20.

Step 1008: Curing and/or completely crosslinking the one or more adhesive layers, in particular the adhesive layer 41.

Step 1009: Optionally removing the component part 1 from the carrier receiver 30, for example manually, by means of a robot arm, by means of a removal means and/or by means of the label receiver. It is also possible here for a transfer of the component part 1 to be effected for example by means of an X/Y or X/Y/Z shift mechanism, for example to be effected onto a conveyor belt and/or onto and/or into a housing.

Step 1010: Optionally checking the component part 1 by means of optical inspection by means of cameras and/or optical sensors or visual inspection by a human and/or by means of one or more sensors. Here, in particular, measured values with respect to the geometry, transmittance, electrical capacitance, electrical resistance, are compared with a target value. The device preferably has means for comparing the values measured by means of the one or more sensors with a target value.

Step 1011: Optionally placing the component part 1, in particular manually and/or by means of a robot arm and/or by means of an X/Y or X/Y/Z shift mechanism or by means of conveyors, for example at a storage location and/or in a package.

The device has been configured in particular for carrying out one or more of the step 1001 to 1011, in particular step 1005, in an automated manner.

Figure 6:
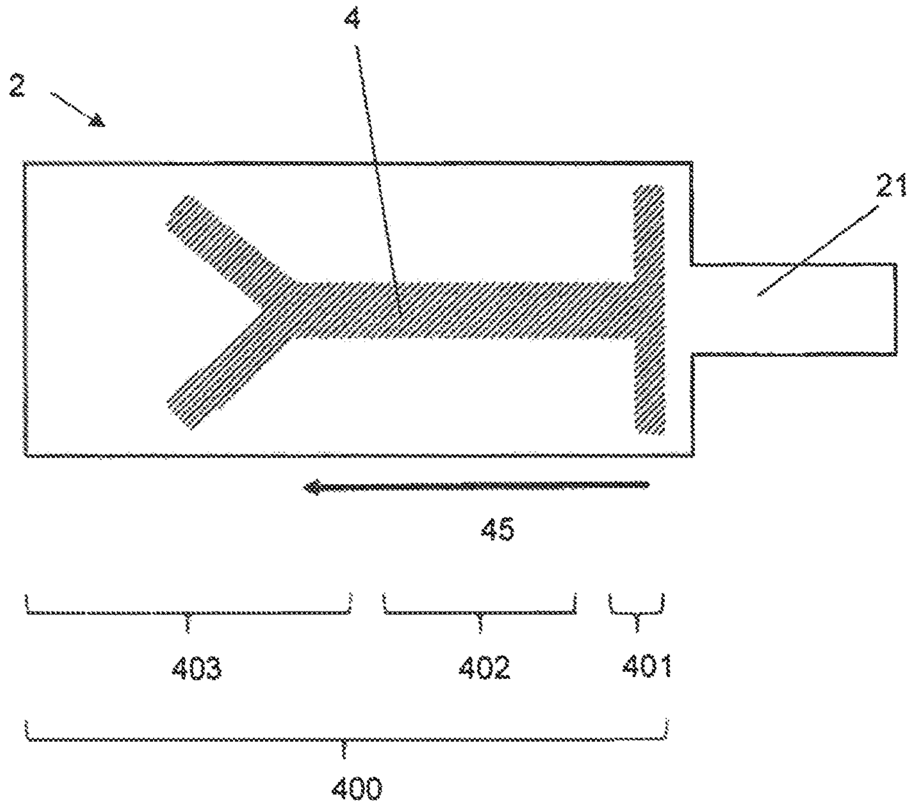

FIG. 6 shows, schematically, an example of a label 2, on which the adhesive 4 has been or is deposited. It is in particular a top view and/or a view perpendicular to a plane spanned by the example label 2. As is shown by way of example by FIG. 6, it is possible for the adhesive 4 to have been or to be applied to the label 2 over part of the surface. The adhesive 4 has one or more first defined shapes. It is possible in particular for the first defined shapes of the adhesive 4 to have one or more of the following shapes: straight and/or curved lines, bone structure, T shape, Y shape, I shape, U shape, serpentines, nodes, branches, fractal shapes.

It is possible in particular for the one or more first defined shapes to have cross-section dimensions, in particular diameter, in a range of from 50 μm to 5,000 μm, preferably in a range of from 500 μm to 3,000 μm. For example, the adhesive is applied as a "bead". A preferred range of the viscosity lies in a range of from 500 mPa·s to 2,000 mPa·s, further preferably in a range of from 1,000 mPa·s to 1,500 mPa·s. It is advantageously guaranteed that the adhesive remains stable in the one or more first defined shapes. The adhesive 4 preferably has been or is applied with a width in a range of from 100 μm to 10,000 μm, preferably in a range of from 1,000 μm to 6,000 μm. The width is preferably measured in a top view and/or when viewed perpendicular to a plane spanned by the label 2 or the carrier 3, thus in particular when viewed as shown in FIG. 6.

A preferred adhesive has a temperature resistance of from −50° C. to 150° C. and/or a flash point of over 100° C. and/or a refractive index (nD20) in a range of from 1 to 2, preferably 1.2 to 1.8, preferably from 1.46 to 1.48.

As is illustrated by FIG. 6 by way of example, it is possible for adhesive 4 to have been or to be applied exclusively to the label 2 in step c). However, it is also conceivable that in step c) one or more first layers of the adhesive 4 are applied to the label 2 partially, in particular over a small area, and one or more second layers of the adhesive 4 are applied to the carrier 3 over the whole surface and/or over a large area or one or more first layers of the adhesive 4 are applied to the carrier 3 partially, in particular over a small area, and one or more second layers of the adhesive 4 are applied to the label 2 over the whole surface and/or over a large area.

In addition, it is conceivable that the adhesive 4 is applied to the label 2 and a primer has been or is applied to the carrier 3 or a primer has been or is applied to the label 2 and the adhesive 4 is applied to the carrier 3.

With respect to the composition of the adhesive 4, reference is made in particular to the above statements. It is preferably an adhesive crosslinkable by means of UV radiation and/or with visible light.

During the laying of the label 2 and the carrier 4 one on top of the other, the adhesive is in particular further distributed between the label 2 and the carrier 4, from which the one or more adhesive layers 41 with one or more second defined shapes result, with the result that preferably the layer thickness of the first defined shapes is greater at least in areas than the layer thickness of the second defined shapes and/or in a top view the area of the first defined shape is greater than the area of the second defined shapes. As is also illustrated by FIG. 6 by way of example, it is possible for the surface density of the first defined shapes relative to the surface area covered with the one or more adhesive layers 41 after the label 2 and the carrier 3 have been laid one on top of the other to be less than 90%, preferably less than 80%. It is expedient that the surface density of the one or more first shapes is at least 5%.

An example defined relative movement of the label 2 and the carrier 3 is indicated here in particular by the arrow 45, wherein the arrow specifies the starting point of a contact of the label 2, the adhesive 4 and the carrier 3 and the direction of areas in which a contact of the label 2, the adhesive 4 and the carrier 3 is subsequently produced. The sequence shown can be achieved for example by a rotational movement of the label receiver 20, in particular a seesawing movement and/or an unrolling movement. By contact is meant here in particular that a line, preferably a vertical line, which extends through the label 2, the adhesive 4 and the carrier 3, can be formed in a cross section, for example a cross section as shown in relation to FIG. 3*f*.

As is illustrated in addition by FIG. 6 by way of example, it is possible for the adhesive 4 to be deposited inside one or more first areas, such as the area 400, of the label 2 for each area of the one or more first areas, thus here in the area 400, in an initial area 401 and in a following area 403 of the label 2. During the laying of the label 2 and the carrier 3 one on top of the other a contact of the label 2, the adhesive 4 and the carrier 3 is is produced in the initial area 41 first and then, preferably lastly, in the following area 403. The adhesive 4 with the one or more first defined shapes has a higher surface density in the initial area 401 than in the following area 403.

In the case of a depositing of the adhesive 4 onto the carrier, such areas can be defined analogously.

The initial area 401 can be formed for example by a proportion of at most 20% of the total surface area of the label which has a connection of label 2, adhesive 4 and carrier 3 in the respective first area first. The following area 403 can be formed for example by a proportion of at least 80% of the total surface area of the label which has a connection of label 2, adhesive 4 and carrier 3 in the respective first area last. The one or more first defined shapes can in particular also not be provided in the following area 403 and adhesive 4 can first be distributed by being displaced thereto. It is conceivable that there is only one first area 40, as is illustrated by way of example by FIG. 6. It is also possible for an intermediate area 402 to be present for example between the initial area 401 and the following area 403. The surface density is preferably lower in the intermediate area 402 than in the initial area 401 and can be lower or higher than in the following area 403.

The surface density is preferably calculated when viewed perpendicular to a plane spanned by the label and/or the carrier. The surface density is preferably calculated from the area of a surface area covered by adhesive 4 in the first defined shapes in relation to the surface area of the label 2 and/or of the carrier 3 which is provided with the adhesive 4 in the second defined shape or with the one or more adhesive layers 41 after the label 2 and the carrier 3 have been laid one on top of the other.

The adhesive 4 with the one or more first defined shapes preferably has been or is with a distance of at least 1 mm, preferably at least 2 mm, from an outer edge and/or from an outer rim of a surface of the label 2 and/or of the carrier 3 and/or from an edge of an opening inside the label 2 and/or the carrier 3 to which the adhesive 4 is applied.

Figure 7A:
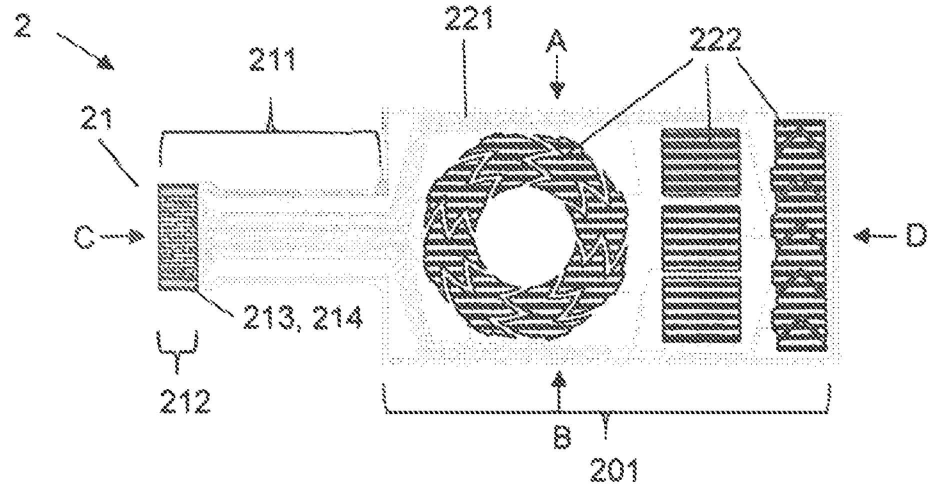

FIG. 7*a* shows, schematically, a top view of an example label 2 and/or a view perpendicular to a plane spanned by an example label 2. The label 2 comprises the optional contacting tail 21, which is arranged at least in a contact area 211. As is shown in this way in particular by FIG. 7*a* by way of example, it is possible for the label 2 to have an optional contacting tail 21 for contacting, in particular electrically contacting, the further layer, in particular the electrically conductive functional layer 22, and/or the one or more electrical and/or electronic and/or optical and/or optoelectronic components 261. As is shown in addition by FIG. 7*a* by way of example, it is possible for the label 2 to have conductive tracks 221 and touch areas 222, preferably for touch sensors, in particular with capacitive elements for touch sensors, which are contactable via the conductive tracks 222 by means of the contacting tail 21. At least such conductive tracks 221 and/or touch areas 222 are preferably comprised by the functional layer 22. It is possible for one or more touch areas to be formed. The one or more touch areas have preferably been provided over part of the surface and in particular adapted in terms of their shape to operating functions of the component part. Conductive structures, in particular consisting of structured metal surfaces (for example as a regular or irregular preferably fine grid) or of preferably very thin metal surfaces or of transparent electrically conductive substances, such as e.g. electrically conductive metal oxides, such as ITO (indium tin oxide), and/or of electrically conductive plastics, such as PEDOT, which are preferably designed transparent and/or appearing transparent to the human eye, are preferably present in the touch areas 222. It is thus possible for the label 2 to comprise or to have been formed by, in particular, a sensor film, wherein the sensor film preferably forms a sensor function, preferably a touch sensor function. The sensor function, preferably touch sensor function, has been or is provided, in particular, by means of the electrically conductive functional layer of the label. It is possible for the sensor film and/or the electrically conductive functional layer, in particular the one or more conductive tracks and/or the one or more capacitive elements, and/or the carrier layer to be transparent and/or to be non-transparent, in particular opaque.

Figure 7B:
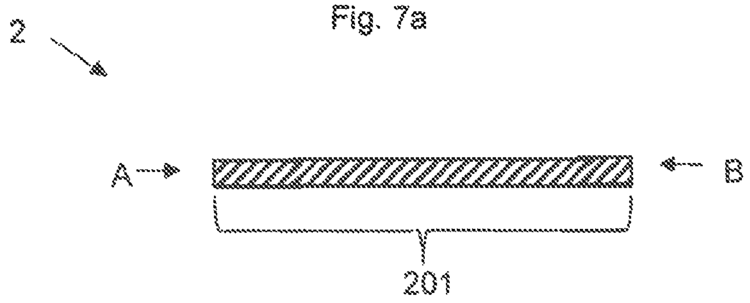
Figure 7C:
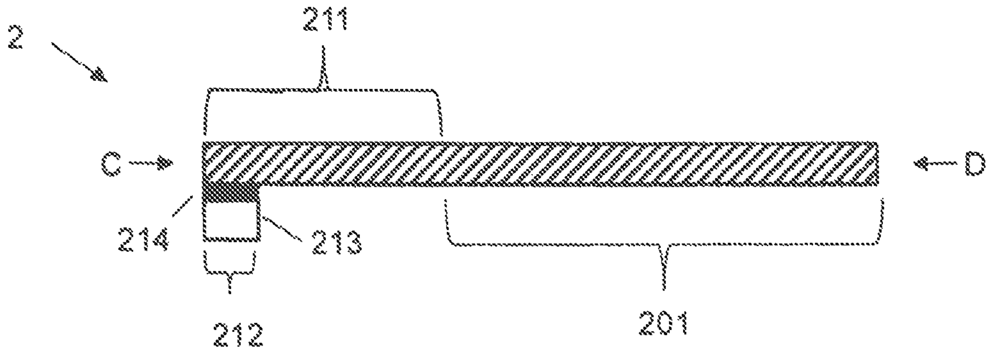

FIG. 7*c* shows by way of example the contact area 211 in a schematic cross section through the label 2 of an area which is labeled from C to D in FIG. 7*a*. FIG. 7*b* shows by way of example a schematic cross section through the label 2 in the area from A to B in FIG. 7*a*. For example, the upper side shown in the cross section or the lower side has been provided for connection to the carrier 3. The one or more adhesive layers 41 are thus formed on this side, in particular through the laying of the label 2 and the carrier 3 one on top of the other. The cross section in FIG. 7*b* thus shows for example only the sensor area 201, wherein the cross section in FIG. 7*c* shows both the sensor area 201 and the contact area 211.

The contacting tail 21 preferably has a smaller surface area than the rest of the label 2, in particular when viewed perpendicular to a plane spanned by the label 2. In the method the contacting tail 21 preferably is and/or remains free of adhesive 4, preferably free of adhesive 4 and/or free of material of the carrier 3 at least in a contact area 211, and/or the device, in particular the carrier receiver and the label receiver, has been configured such that this is possible.

In particular, the one or more first defined shapes of the adhesive 4 are applied with an adapted shape and amount, for example to form beads in a bone structure, and in particular the contact area 211 is left free of adhesive 4, as is to be seen for example in FIG. 6. The defined relative movement of the label 2 and the carrier 3 preferably has been or is adapted, in particular by means of a lifting movement and/or a seesawing movement, with the result that the contact area 211 remains free of adhesive 4, in particular even if a displacement of the adhesive 4 takes place. The contacting tail 21 is held on the label receiver 20 preferably in a defined position, in particular during the laying of the label 2 and the carrier 3 one on top of the other. For this, the label receiver can for example have means for suctioning the contacting tail 21 by means of a vacuum, one or more clamping devices and/or one or more spacers.

At least one subarea of the contact area 211 is suitable for the electrical contacting of the functional layer 22 and/or of the one or more electrical and/or electronic and/or optical and/or optoelectronic components. As is shown by way of example by FIG. 7*a*, it is possible for a subarea 212 of the contact area 211 of the contacting tail 21 to have a reinforcing element 213. Such a reinforcing element is in particular also called a "stiffener". The reinforcing element 213 preferably has been or is connected to the label 2 via a glue 214, which is in particular also called a "stiffener glue", as is illustrated by way of example with reference to FIG. 7*c*. In particular in the subarea 21, an electrical contacting of the functional layer 22 can thus be produced. FIGS. 7*a*, 7*b*, and 7*c* furthermore show by way of example a sensor area 201, which preferably represents an area connected or to be connected to the carrier 3 and is present neighboring the contact area 211. The one or more adhesive layers, in particular the adhesive layer 41, are preferably formed in the sensor area 201. The contacting tail 21 thus preferably provides an electrical contacting possibility on a side of the contacting tail 21 facing away from the sensor area 201. For this, at least one electrically conductive layer of the functional layer 22 preferably extends from the sensor area 201 into the contacting area 211.

Figure 8A:
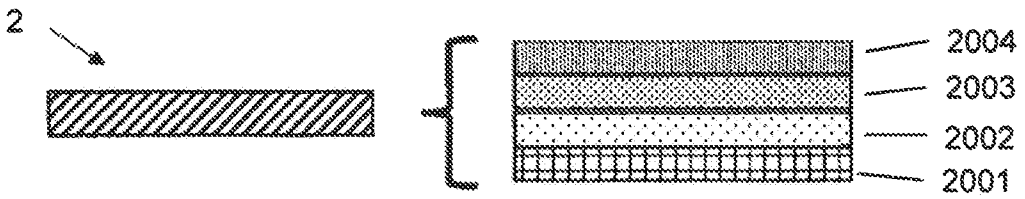

FIG. 8*a* schematically shows an example of a cross section of a label 2 with a complex layer structure. The label 2 can for example be multi-layered, as is illustrated by the layers 2001 to 2002. One or more layers of the label 2, in particular all layers of the label 2, can also be present in the contact area 211 and/or in the contacting tail 21. The underside of the label 2 is provided with adhesive 4 and connected to the carrier 3. During the method, for example, the upper side comes directly into contact with the label receiver 20. Preferably, one of the layers 2001 to 2004 has been formed as the at least one carrier layer and another of the layers 2001 to 2004 has been formed as the further layer. The remaining layers are optional. As an alternative or in addition to the further layer, however, one or more components can also have been arranged on the carrier layer, for example the components 261 shown in FIG. 8*c* and FIG. 8*g*.

Figure 8B:
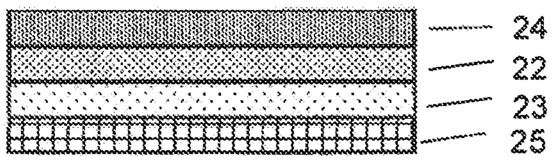

FIG. 8*b* shows, schematically, a cross section of a label 2 with the following layer sequence: a protective layer 24, the functional layer 22, which here is preferably a sensor layer 22 with one or more electrically conductive layers, the carrier layer 23, a primer 25. The primer 25 represents in particular an adhesion-promoter layer 25. It is conceivable that the further layer comprises or is formed by the primer 25 and the remaining layers on the other side of the carrier layer 23 are optional. Alternatively, the primer 25 is optional and the further layer is at least one other layer which is present in particular on the side of the carrier layer 23 opposite the primer 25.

The protective layer 25 is for example a varnish layer or a film. It is possible for the protective layer to have been firmly integrated in the label 2 or for the protective layer 24 to have been designed detachable, in particular with the result that the protective layer 24 can be detached after the label 2 has been detached from the label receiver 20. The carrier layer 23 is for example a film substrate and/or comprises one or more of the following materials: PET, PC, PMMA, ABS, PC-ABS, PP, PA, PE. It is also conceivable that one or more color layers have been provided instead of the protective layer 24 or between the protective layer 24 and the functional layer 22. The further layer can here comprise one or more of the layers 22 and 24, wherein the remaining layer not comprised by the further layer is optional.

Figure 8C:
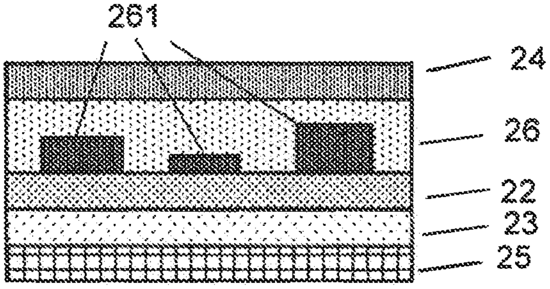

FIG. 8*c* shows a schematic cross section of a label 2 as described in relation to FIG. 8*b*, except that between the protective layer 24 and the functional layer 22 a functional layer 26 has been provided, which comprises one or more components 261, preferably hybrid components, for example selected individually or in combination from: passive components, active components, LEDs, OLEDs, sockets, controllers, processors, resistors, display elements, plugs, sensors, actuators, capacitors, etc. The components have preferably been encapsulated by means of a plastic material, preferably encapsulated by means of polyurethane (PUR). It is also conceivable that the further layer comprises or consists of a functional layer, such as for example the functional layer 26, which comprises and/or encapsulates in particular the one or more electrical and/or electronic and/or optical and/or optoelectronic components, such as the components 261. The further layer can comprise in particular one or more of the layers 22, 24 and 26, wherein the remaining layers not comprised by the further layer are optional.

Figure 8D:
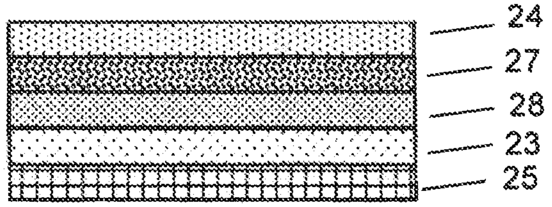

FIG. 8*d* shows a schematic cross section of a label 2 as described in relation to FIG. 8*b*, except that here a functional layer 27 with an optical function has been provided instead of a functional layer 22, which is preferably a sensor layer 22 with one or more electrically conductive layers. The optical function can in particular be a decoration and/or a display by means of a screen. In particular, the optical functional layer 27 comprises or preferably consists of one or more of the following components: polarizer, color filter, diffuser, privacy filter, anti-reflective layer, anti-reflection coating. In addition, the label 2 here has one or more decorative layers 28, which are arranged for example between the functional layer 27 and the carrier layer 23. The one or more decorative layers 28 preferably comprise or preferably consist of one or more of the following layers: layer with an endless pattern, layer with a single image, partial layer, whole-surface layer, metal layer, color layer, preferably colored varnish layer, in particular full-tone colored varnish layer and/or halftone colored varnish layer, preferably colored varnish layer with a print raster, varnish layer with a relief structure imprinted therein, reflective layer, in particular metal layer or HRI layer (HRI=High Refractive Index). The further layer can in particular comprise one or more of the layers 24, 27 and 28, wherein the remaining layers not comprised by the further layer are optional.

Figure 8E:
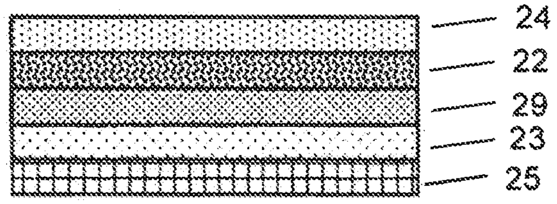

FIG. 8*e* shows a schematic cross section of a label 2 as described in relation to FIG. 8*b*, except that between the functional layer 22 and the carrier layer 23 one or more color layers 29 have been provided, which can in particular have been provided over the whole surface and/or over part of the surface. The one or more color layers 29 preferably comprise or preferably consist of one or more of the following layers: one or more varnish layers, preferably varnish layers dyed with pigments and/or dyes, one or more printed layers, printed layer with an endless pattern, printed layer with a single image, partial printed layer, whole-surface printed layer, full-tone printed layer and/or halftone printed layer, preferably printed layer with a print raster. The further layer can in particular comprise one or more of the layers 22, 24 and 29, wherein the remaining layers not comprised by the further layer are optional.

Figure 8F:
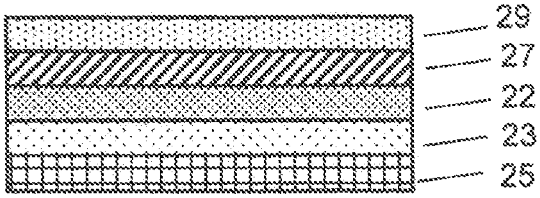

FIG. 8*f* shows a schematic cross section of a label 2 as described in relation to FIG. 8*b*, except that one or more color layers 29 have been arranged instead of the protective layer 24, and a functional layer 27 has been arranged between the color layers 29 and the functional layer 22. The one or more color layers can in particular have been formed as described in relation to FIG. 8*e*. The functional layer 27 can in particular have been formed as in relation to FIG. 8*d*. The functional layer 27 of the example in FIG. 8*f* is in particular a diffuser layer, which is preferably present over the whole surface or partially, in particular patterned. A diffuser layer can for example have been or be formed by a diffuser varnish. Instead of the diffuser layer of the label described in relation to FIG. 8*f*, for example a layer 26 as described in relation to FIG. 8*c* can also have been provided. The further layer can in particular comprise one or more of the layers 22, 27 and 29, wherein the remaining layers not comprised by the further layer are optional.

Figure 8G:
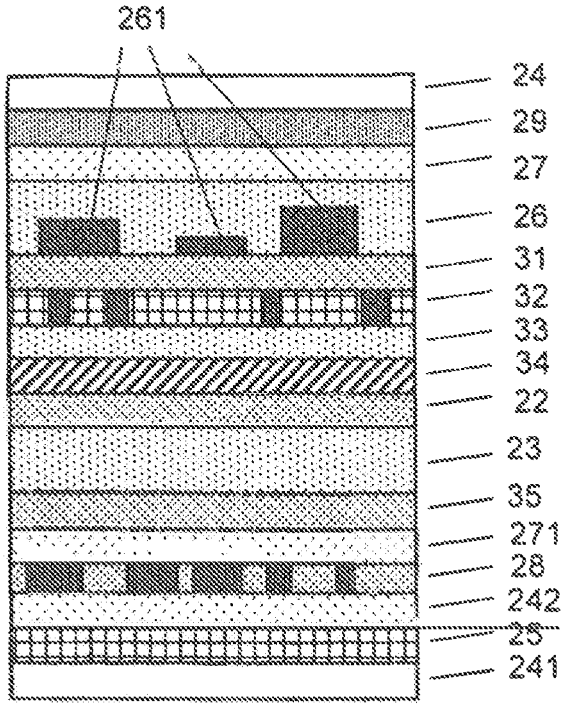

FIG. 8*g* shows a schematic cross section of a label 2 as described in relation to FIG. 8*b*, except that a second protective layer 241 has been provided on the side of the primer 25 facing away from the protective varnish 24, and the following layer sequence has been provided between the protective layer 24 and the primer 25, in particular starting from the protective layer 25:

one or more color layers 29, in particular a shadow mask, a functional layer 27, which is preferably a diffuser layer 27, a functional layer 26, which preferably comprises one or more components, as is described in particular in relation to FIG. 8*c* for the functional layer 26, a contacting layer 31, in particular for electrically contacting the one or more components 261 of the functional layer 26 and/or for electrically contacting the functional layer 22, one or more first intermediate layers 32, for example comprising one or more insulators and/or one or more dielectrics, a further functional layer 33, for example comprising sensors, one or more second intermediate layers 34, for example comprising one or more insulators and/or one or more dielectrics, the functional layer 22, which here is preferably a sensor layer 22 with one or more electrically conductive layers and in particular can have been formed as described in relation to FIG. 8*b*, the carrier layer 23, which can in particular have been formed as described in relation to FIG. 8*b*, one or more third intermediate layers 35, for example comprising one or more insulators and/or one or more dielectrics, a further diffuser layer 271, the one or more decorative layers 28, which can in particular have been formed as described in relation to FIG. 8*d*, a third protective layer 242, which can in particular have been formed of a protective varnish or a protective film, the primer 25, which can in particular have been formed as described in relation to FIG. 8*b*.

The intermediate layers 32, 33 and 34 can thus act in particular as an electrically insulating functional layer.

The one or more decorative layers 28 here preferably are or comprise a shadow mask.

The contacting layer 31 extends for example through the sensor area 201 as well as the optional contacting tail 21 or contact area 211. It is also possible for layers lying between the functional layer 22 and the contacting layer 31 and/or between the functional layer 33 and the contacting layer 31 to have through-connections, in particular such that the contacting layer 31 and the functional layer 22 are electrically conductively connected and/or galvanically connected.

A shadow mask is in particular a partially provided opaque layer.

The further protective layer 241 is in particular a protective film. The second protective layer 241 is preferably detachable from the label 2. In particular, the second protective layer 241 is detached before the glue 4 is deposited on the label 2 and/or before the label 2 and the carrier 3 are laid one on top of the other.

The further layer can in particular comprise one or more of the layers 24, 29, 27, 26, 31, 31, 33, 34, 22, 23, 35, 271, 28, 242, 25, 241, wherein the remaining layers not comprised by the further layer are optional.

The label 2 has in particular been designed such that the cross sections shown in FIGS. 8*a* to 8*g* form, on their underside, thus along the lower visible rim, a surface area which are to be connected, are connected and/or can be connected to the carrier 3 via the adhesive 4 and/or the one or more adhesive layers 41. The individual thicknesses are in particular not to scale in FIGS. 8*a* to 8*g* and the orders of the layer structures can be swapped as desired. In particular, layers can be omitted or be present multiple times as desired. Further layers can also have been provided. Each individual layer can be a layer packet consisting of different layers and/or have been applied over the whole surface or over part of the surface.

LIST OF REFERENCE NUMBERS

1 component part
1001 to 1010 steps
2 label
20 label receiver
21 contacting tail
211 contact area
212 subarea
213 reinforcing element (stiffener)
214 glue (stiffener glue)
22 functional layer(s)
221 conductive tracks
222 touch areas
23 carrier layer
24, 241, 242 protective layers
25 primer layer
26 functional layer with components
261 components
27, 271 diffuser layer(s)
28 decorative layer(s)
29 color layer(s)
3 carrier
30 carrier receiver
301 step
302 indentation
303 elevation
304 nuisance particle
31 contacting layer
32, 34, 35 intermediate layer(s)
4 adhesive
40 adhesive dispensing unit
400 first area

401 initial area
402 intermediate area
403 following area
41 adhesive layer(s)
52, 520, 53 curvature areas
60 precuring unit
70 curing unit
80 pretreatment unit

The invention claimed is:

1. A method for producing a component part, wherein the method is carried out by means of a device with a label receiver, a carrier receiver as well as an adhesive dispensing unit and has at least the following steps:

a1) providing a label with a flexible layer structure comprising at least one carrier layer and
 i) a further layer and/or
 ii) one or more electrical and/or electronic and/or optical and/or optoelectronic components;
a2) receiving the label with the label receiver;
b1) providing a carrier;
b2) receiving the carrier by means of the carrier receiver;
c) applying, by means of the adhesive dispensing unit, a flowable adhesive, in one or more first geometric shapes, to the label held by means of the label receiver and/or to the carrier held by means of the carrier receiver;
d) laying the label and the carrier one on top of the other by means of a defined relative movement of the label receiver and the carrier receiver, such that the adhesive is arranged between the label and the carrier, and one or more adhesive layers are obtained between the label and the carrier;
e) at least partially curing and/or at least partially cross-linking the one or more adhesive layers.

2. The method according to claim 1, wherein the label, the adhesive, the one or more adhesive layers and/or the carrier are processed at a temperature which does not exceed a glass transition temperature of the carrier, of the label and/or of the adhesive and/or is less than 80° C.

3. The method according to claim 1, wherein a pressure which does not exceed 10 N/cm$^2$ or exceeds 10 N/cm$^2$ for at most 10 s acts on the label, the adhesive, the one or more adhesive layers and/or the carrier.

4. The method according to claim 1, wherein the label is curved by being received by means of the label receiver.

5. The method according to claim 1, wherein the carrier has a curved carrier surface at least in a curvature area, wherein the curvature area of the label is applied to the curvature area of the carrier.

6. The method according to claim 1, wherein the adhesive comprises or consists of a cold glue.

7. The method according to claim 1, wherein the adhesive comprises or consists of an optical glue.

8. The method according to claim 1, wherein the adhesive is crosslinkable or is crosslinked and/or the one or more adhesive layers have been or are crosslinked.

9. The method according to claim 1, wherein the application of the adhesive is effected by dispensing or by printing.

10. The method according to claim 1, wherein the adhesive has Newtonian or shear-thinning fluid properties and/or a viscosity in a range of from 0.5 mPa·s to 100,000 mPa·s.

11. The method according to claim 1, wherein the one or more first geometric shapes have cross-section dimensions, in a range of from 50 μm to 5,000 μm.

12. The method according to claim 1, wherein the laying of the label and the carrier one on top of the other is effected such that the one or more adhesive layers are arranged with a minimum thickness of 2 μm.

13. The method according to claim 1, wherein a surface density of the one or more first geometric shapes relative to a surface area covered with the one or more adhesive layers after the label and the carrier have been laid one on top of the other, is less than 90%.

14. The method according to claim 1, wherein the adhesive is deposited inside one or more first areas of the label and/or of the carrier for each area of the one or more first areas in an initial area and in a following area of the label and/or of the carrier, wherein during the laying of the label and the carrier one on top of the other a contact of the label, the adhesive and the carrier is produced in the initial area first and then in the following area.

15. The method according to claim 14, wherein the adhesive with the one or more first geometric shapes has a higher surface density in the initial area than in the following area.

16. The method according to claim 1, wherein the adhesive with the one or more first geometric shapes is applied with a distance of at least 1 mm, from an edge and/or a rim of a surface of the label and/or of the carrier to which the adhesive is applied and/or from an edge of an opening of the label and/or of the carrier.

17. The method according to claim 1, wherein the adhesive is applied with a width in a range of from 100 μm to 10,000 μm.

18. The method according to claim 1, wherein the adhesive is applied exclusively to the label.

19. The method according to claim 1, wherein the adhesive is applied to the label over a first area and is applied to the carrier over a second area, wherein the first area is larger or smaller than the second area.

20. The method according to claim 1, wherein the adhesive is applied to the label and a primer has been or is applied to the carrier or a primer has been or is applied to the label and the adhesive is applied to the carrier.

21. The method according to claim 1, wherein through the defined relative movement of the label receiver and the carrier receiver the adhesive is displaced at least in areas from the one or more first geometric shapes to one or more second geometric shapes of the one or more adhesive layers.

22. The method according to claim 1, wherein the laying of the label and the carrier one on top of the other is carried out through a translational and/or rotational movement of the label in relation to the carrier.

23. The method according to claim 1, wherein the label has a geometrical shape substantially matching a geometrical shape of the label receiver and/or wherein the label and/or the label receiver has markings as registration marks.

24. The method according to claim 1, wherein the laying of the label and the carrier one on top of the other is carried out such that a position of the label does not deviate from a position of the carrier by more than +/−1 mm.

25. The method according to claim 1, wherein the at least partial curing and/or at least partial crosslinking is effected by means of irradiation.

26. The method according to claim 1, wherein the one or more adhesive layers are cured and/or completely crosslinked by means of irradiation, after the label receiver has been taken off.

27. The method according to claim 1, wherein the label has a thickness in a range of from 25 μm to 350 μm.

28. The method according to claim 1, wherein the carrier has a three-dimensional shape.

29. A device for producing a component part, wherein the device comprises:

a label receiver for receiving a label with a flexible layer structure comprising at least one carrier layer and i) a further layer and/or ii) one or more electrical and/or electronic and/or optical and/or optoelectronic components;

a carrier receiver for receiving a carrier;

an adhesive dispensing unit for applying, by means of the adhesive dispensing unit, a flowable adhesive, in one or more first geometric shapes, to the label and/or to the carrier, wherein the device has been configured such that a laying of the label and the carrier one on top of the other can be carried out by means of a defined relative movement of the label receiver and the carrier receiver for arranging the adhesive between the label and the carrier, such that one or more adhesive layers can be obtained between the label and the carrier.

30. The device according to claim 29, wherein the device has been configured such that, through the defined relative movement of the label receiver and the carrier receiver, the adhesive can be displaced or is displaced at least in areas from the one or more first geometric shapes to one or more second geometric shapes of the one or more adhesive layers.

31. The device according to claim 29, wherein the device has a precuring unit for precuring the one or more adhesive layers partially or over the whole surface.

32. The device according to claim 29, wherein the label receiver has one or more transparent areas and/or has one or more holes.

33. The device according to claim 29, wherein the label receiver, the carrier receiver and the adhesive dispensing unit have a maximum distance from each other of 2 m.

* * * * *